United States Patent
Nagashima et al.

(10) Patent No.: US 7,303,620 B2
(45) Date of Patent: Dec. 4, 2007

(54) WATER-BASED INK, AND IMAGE FORMATION METHOD AND RECORDED IMAGE USING THE INK

(75) Inventors: Akira Nagashima, Tokyo (JP); Sadayuki Sugama, Ibaraki (JP); Masako Udagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/975,072

(22) Filed: Oct. 28, 2004

(65) Prior Publication Data

US 2005/0088501 A1 Apr. 28, 2005

Related U.S. Application Data

(63) Continuation of application No. PCT/JP2004/006334, filed on Apr. 30, 2004.

(30) Foreign Application Priority Data

May 2, 2003 (JP) .............................. 2003-127621

(51) Int. Cl.
*C09D 11/02* (2006.01)
(52) U.S. Cl. .................................... 106/31.6
(58) Field of Classification Search ................. 106/31.6
See application file for complete search history.

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,723,129 A | 2/1988 | Endo et al. | 346/1.1 |
| 4,740,796 A | 4/1988 | Endo et al. | 346/1.1 |
| 5,078,790 A | 1/1992 | Tochihara et al. | 106/20 |
| 5,080,716 A | 1/1992 | Aoki et al. | 106/20 |
| 5,131,949 A | 7/1992 | Tochihara et al. | 106/20 |
| 5,132,700 A | 7/1992 | Tochihara et al. | 346/1.1 |
| 5,213,613 A | 5/1993 | Nagashima et al. | 106/20 |
| 5,221,334 A | 6/1993 | Ma et al. | 106/20 |
| 5,258,066 A | 11/1993 | Kobayashi et al. | 106/22 |
| 5,272,201 A | 12/1993 | Ma et al. | 524/505 |
| 5,296,022 A | 3/1994 | Kobayashi et al. | 106/20 |
| 5,409,529 A | 4/1995 | Nagashima et al. | 106/22 |
| 5,451,251 A | 9/1995 | Mafune et al. | 106/22 |
| 5,478,383 A | 12/1995 | Nagashima et al. | 106/22 |
| 5,482,545 A | 1/1996 | Aoki et al. | 106/22 |
| 5,519,085 A | 5/1996 | Ma et al. | 524/503 |

(Continued)

FOREIGN PATENT DOCUMENTS

JP 59-123670 7/1984

(Continued)

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

A water-based ink that comprises a liquid medium containing water, a water-dispersible coloring material and a surfactant, wherein when the ink is attached onto a recording material, the water-dispersible coloring material forms a plurality of minute interspersed aggregations and is fixed on the recording material, and a recording method using the ink.

27 Claims, 8 Drawing Sheets

U.S. PATENT DOCUMENTS

| | | | |
|---|---|---|---|
| 5,571,313 A | 11/1996 | Mafune et al. | 106/22 |
| 5,733,363 A | 3/1998 | Nagashima et al. | 106/31.43 |
| 5,852,075 A | 12/1998 | Held | 523/161 |
| 5,865,883 A | 2/1999 | Teraoka et al. | 106/31.32 |
| 5,879,439 A * | 3/1999 | Nagai et al. | 106/31.28 |
| 5,936,649 A | 8/1999 | Ikeda et al. | 347/87 |
| 6,117,921 A | 9/2000 | Ma et al. | 523/161 |
| 6,387,168 B1 | 5/2002 | Koitabashi et al. | 106/31.6 |
| 6,554,891 B1 * | 4/2003 | Momose et al. | 106/31.86 |
| 6,613,136 B1 * | 9/2003 | Arita et al. | 106/31.58 |
| 6,676,254 B2 | 1/2004 | Nagashima et al. | 347/100 |
| 6,890,378 B2 * | 5/2005 | Yatake et al. | 106/31.59 |
| 2002/0075369 A1 | 6/2002 | Ota et al. | 347/100 |
| 2002/0174801 A1 | 11/2002 | Hano et al. | 106/31.15 |
| 2004/0201658 A1 * | 10/2004 | Jackson et al. | 347/100 |
| 2004/0231554 A1 | 11/2004 | Udagawa et al. | 106/31.15 |

FOREIGN PATENT DOCUMENTS

| | | |
|---|---|---|
| JP | 5-179183 | 7/1993 |
| JP | 6-136311 | 5/1994 |
| JP | 7-53841 | 2/1995 |
| JP | 10-87768 | 4/1998 |
| JP | 11-43639 | 2/1999 |
| JP | 11-269418 | 10/1999 |
| JP | 2000-113331 | 4/2000 |
| JP | 2002-20673 | 1/2002 |
| JP | 2002-226751 | 8/2002 |
| JP | 2002-331748 | 11/2002 |

* cited by examiner

AGGLOMERATES OF WATER-DISPERSIBLE COLORING MATERIAL

ASSEMBLY OF WATER-DISPERSIBLE COLORING MATERIAL

CELLULOSE FIBER

WATER-BASED INK, AND IMAGE FORMATION METHOD AND RECORDED IMAGE USING THE INK

This application is a continuation of International Application No. PCT/JP2004/006334 filed Apr. 30, 2004, which claims the benefit of Japanese Patent Application No. 2003-127621, filed May 2, 2003.

BACKGROUND OF THE INVENTION

1. Field of the Invention

The present invention provides a water-based ink, more particularly a water-based ink that can provide an image having high image quality, excellent rub-resistance and excellent fastness, especially water fastness, and high reliability. The present invention also provides a recorded image formation method and an image recorded with the above ink. As a preferable application, it also provides a water-based ink excellent in fluorescent emission properties, and a recorded image formation method and a recorded image using the ink.

2. Related Background Art

Various inks have been proposed and studied for water-based ink including writing inks and ink-jet recording inks, aiming at improvement of image fastness and image quality.

Conventionally, water-soluble coloring materials are used in water-based inks, so that the inks are excellent in reliability such as sticking resistance and stability with time, and can provide high image density. On the other hand, image fastness such as water resistance and light resistance of the recorded images is often unsatisfactory.

As a countermeasure, for example, use of a water-soluble coloring material having carboxylic acid has been proposed. However, while water resistance of the image is improved, the coloring material in the ink tends to precipitate and stick, which causes clogging if the ink is used in an ink-jet recording method in which ink droplets are discharged through a nozzle.

Recently, use of water dispersing coloring materials such as carbon black and organic pigments in water-based ink has been proposed to improve image fastness such as water resistance and light resistance. In a popular water-based ink using a water dispersible coloring material, a coloring material is dispersed in a water system with a chemical or physical action of a surfactant or resin. When the ink is attached to a recording material, water and liquid media evaporate on the recording material, penetrate and diffuse into the recording material, thus causing aggregation of the water dispersible coloring material to improve image fastness, e.g. water resistance and light resistance, of the recorded image. On the other hand, in recording with an ink containing a water-dispersible coloring material, all of the coloring material aggregates on the surface of a recording material, resulting in poor rub-resistance of the recorded matter.

Meanwhile, Japanese Patent Application Laid-Open No. 2000-113331 discloses an invention for improving fluorescent properties in a relationship between a solvent and a fluorescent coloring material. This publication discloses a recording ink having two types of fluorescent coloring materials of the same color (addition of coloring materials having no fluorescence is also described in Examples), and containing mutually incompatible two types of organic solvents (such as glycerin and a nonionic surfactant) and pure water dissolving them.

In any case, a conventional pigment (water-dispersible coloring material) ink contains a relatively large amount of pigment (e.g. 4% by mass), a surfactant at a level for improving permeability (e.g. 1% by mass), and the like, and the recorded image with such an ink comprises the coloring material aggregated as a plane on the surface of the recording medium.

SUMMARY OF THE INVENTION

Considering the conventional techniques described above, a first object of the present invention is to provide an ink and an image formation method using a water-dispersible coloring material, that improves the image fastness (e.g. water resistance and rub-resistance) of a recorded image, and exhibits an effect that cannot be obtained with conventional techniques.

Further, a second object of the present invention is to provide an image recording method to improve an image density. Further, a third object of the present invention is to provide an ink containing a fluorescent coloring material and an image formation method that provides images of excellent fluorescent properties. Further objects of the present invention will be understood from the description below.

The above objects can be achieved by the present invention according to aspects described below.

The first aspect of the present invention is a water-based ink comprising a liquid medium containing water, a water-dispersible coloring material and a surfactant, wherein when the ink is attached onto a recording material, the water-dispersible coloring material forms a plurality of minute aggregations on the recording material.

The second aspect of the present invention is a water-based ink comprising a liquid medium containing water, a water-dispersible coloring material, and a surfactant that is a poor solvent for the water-dispersible coloring material, wherein when the ink is attached onto a recording material, the ink forms a concentrated image made of interspersed minute aggregations of the coloring material at the center in an enclosed fixation state where the entire periphery of the concentrated image including inside the recording material is surrounded by the liquid medium.

The third aspect of the present invention is a water-based ink comprising a liquid medium containing water, a water-dispersible coloring material, a surfactant that is a poor solvent for the water-dispersible coloring material, and an organic solvent that is a good solvent for the water-dispersible coloring material, wherein when the ink is attached onto a recording material, the ink forms a concentrated image at the center with minute interspersed aggregations of the coloring material in an enclosed fixation state in which the entire periphery of the concentrated image including inside the recording material is surrounded by the liquid medium.

The fourth aspect of the present invention is a water-based ink comprising a liquid medium containing water, a water-dispersible coloring material having fluorescence, and a surfactant, wherein when the ink is attached to a recording material, the fluorescent water-dispersible coloring material forms a plurality of minute interspersed aggregations and is fixed on the recording material.

The fifth aspect of the present invention is a water-based ink including a liquid medium containing water, a water-dispersible coloring material having fluorescence, and a surfactant that is a poor solvent for the water-dispersible coloring material, wherein when the ink is attached onto a recording material, the ink forms a concentrated image of the fluorescent water-dispersible coloring material at the center with dispersed minute aggregations of the fluorescent water-dispersible coloring material in an enclosed fixation state where the entire periphery of the concentrated image including inside the recording material is surrounded by the liquid medium.

The sixth aspect of the present invention is a water-based ink including a liquid medium containing water, a water-dispersible coloring material having fluorescence, a surfactant that is a poor solvent for the water-dispersible coloring material, and an organic solvent that is a good solvent for the water-dispersible coloring material, wherein when the ink is attached onto the a recording material, the ink forms a concentrated image at the center with minute interspersed aggregations of the coloring material in an enclosed fixation state in which the entire periphery of the concentrated image including inside the recording material is surrounded by the liquid medium.

The seventh aspect of the present invention is a recorded image formation method for forming an image with a plurality of dots by applying a water-based ink, which ink comprises a liquid medium containing water, a water-dispersible fluorescent coloring material and a surfactant, and can form a fixation state where a plurality of minute aggregations of the water-dispersible coloring material are dispersed on a recording material, wherein the water-based ink is applied such that the concentrated image regions are not adjacent between the dots.

The eighth aspect of the present invention is a recorded image formation method for forming an image with a plurality of dots by applying a water-based ink on a recording material, which ink comprises a liquid medium containing water, a water-dispersible coloring material and a surfactant and can form a fixation state on a recording material where a plurality of minute aggregations of the water-dispersible coloring material are interspersed, wherein the recorded image is formed such that the requirement of longitudinal resolution≠lateral resolution is met.

The ninth aspect of the present invention is a fluorescent recorded image formation method for forming an image with a plurality of dots by applying a water-based ink, wherein the ink comprises a liquid medium containing water, a water-dispersible coloring material having fluorescence and a surfactant, and when the ink is attached onto a recording material, the water-dispersible coloring material forms a plurality of minute interspersed aggregations and is fixed on the recording material, and wherein the water-based ink is applied such that the concentrated image regions are not adjacent between the dots.

The tenth aspect of the present invention is a fluorescent recorded image formation method for forming an image with a plurality of dots by applying a water-based ink, wherein the ink comprises a liquid medium containing water, a water-dispersible coloring material having fluorescence and a surfactant, and when the ink is attached onto a recording material, the water-dispersible coloring material forms a plurality of minute interspersed aggregates and is fixed on the recording material, and wherein the recorded image is formed such that the requirement of longitudinal resolution # lateral resolution is met.

The eleventh aspect of the present invention is a recorded image, wherein a fixation state of a dispersible coloring material on a recording material is formed by an arrangement of a plurality of minute aggregations of the coloring material interspersed.

The twelfth aspect of the present invention is a fluorescent recorded image, wherein a fixation state of a dispersible coloring material having fluorescence on a recording material is formed by an arrangement of a plurality of minute aggregations of the coloring material interspersed.

The thirteenth aspect of the present invention is an image formation method by superimposing droplets of an ink on a recording medium by using an ink jet recording apparatus, wherein the ink comprises a liquid medium containing water, a water-dispersible coloring material and a surfactant, and forms a fixation state where a plurality of minute aggregations of the water-dispersible coloring material are arranged interspersed on a recording material.

These water-based inks preferably contain a water-soluble crystalline material that is a solid under a normal temperature environment.

DETAILED DESCRIPTION OF THE PREFERRED EMBODIMENTS

The present invention will be now described more in detail with preferred embodiments of the invention.

The inventors have studies various mechaminisms, a variety of coloring materials and inks that can provide images excellent in image fastness such as water resistance, in quality, in density and rub-resistance with satisfactory reliability. As a result, the inventors have found out that fastness (especially water resistance) and rub-resistance of recorded images, and image quality are improved by a water-based ink comprising a liquid medium containing water, a water-dispersible coloring material and a surfactant, of which fixation state on a recording material is such that a large number of minute aggregations of the water-dispersible coloring material are interspersed. Thus, the present invention was made.

The water-dispersible coloring material herein refers to a coloring material which hardly disperses or dissolves in water by itself, but is dispersed in water by the chemical or physical action of a compound having a water-soluble group such as a surfactant or polymer, or a coloring material which has become dispersible in water due to hydrophilic groups such as sulfone and carboxyl groups chemically bonded onto the surface of the material by treating the surface with a compound having low-molecular hydrophilic groups or by oxidizing the surface.

While large aggregates of a water-dispersible coloring material are formed with conventional inks or images, the present invention substantially improves fastness, e.g. water resistance and rub-resistance, of recorded images by creating such a state of an image region formed with an ink dot that minute aggregates of the water-dispersible coloring material (e.g. minute aggregates having a size of about 5 to 20 µm with respect to a dot of 100 µm on the recording material, which can be observed by magnifying them by 300 times under an optical microscope) are interspersed.

First, a mechanism in which the water based single ink of the present invention can improve image fastness, especially water resistance, quality and density of the recorded images, rub-resistance, and fluorescence in some cases will be described. However, the present invention includes complicated interactions, and therefore it is not completely covered by the mechanism described below.

Figure 7:
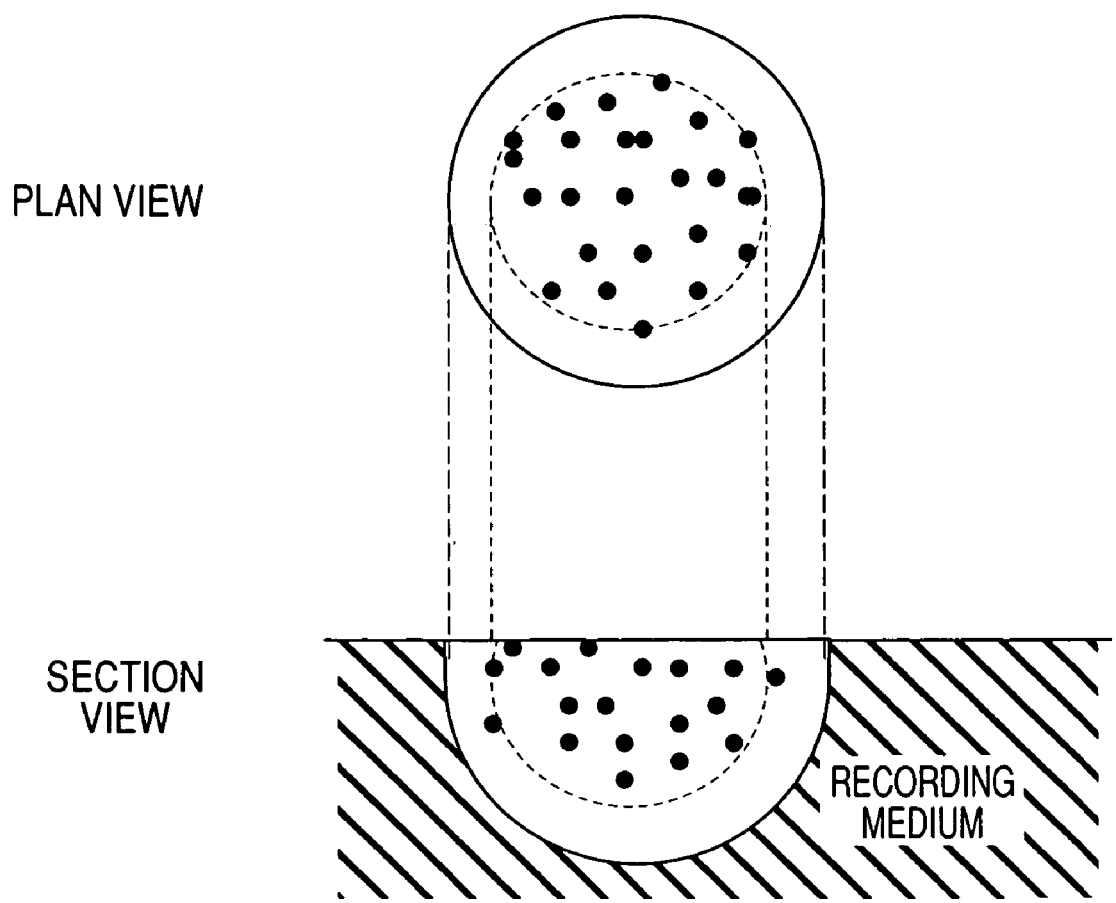
FIG. 7 schematically shows a structure of dots formed on a recording material with an ink of the present invention.
Figure 8:
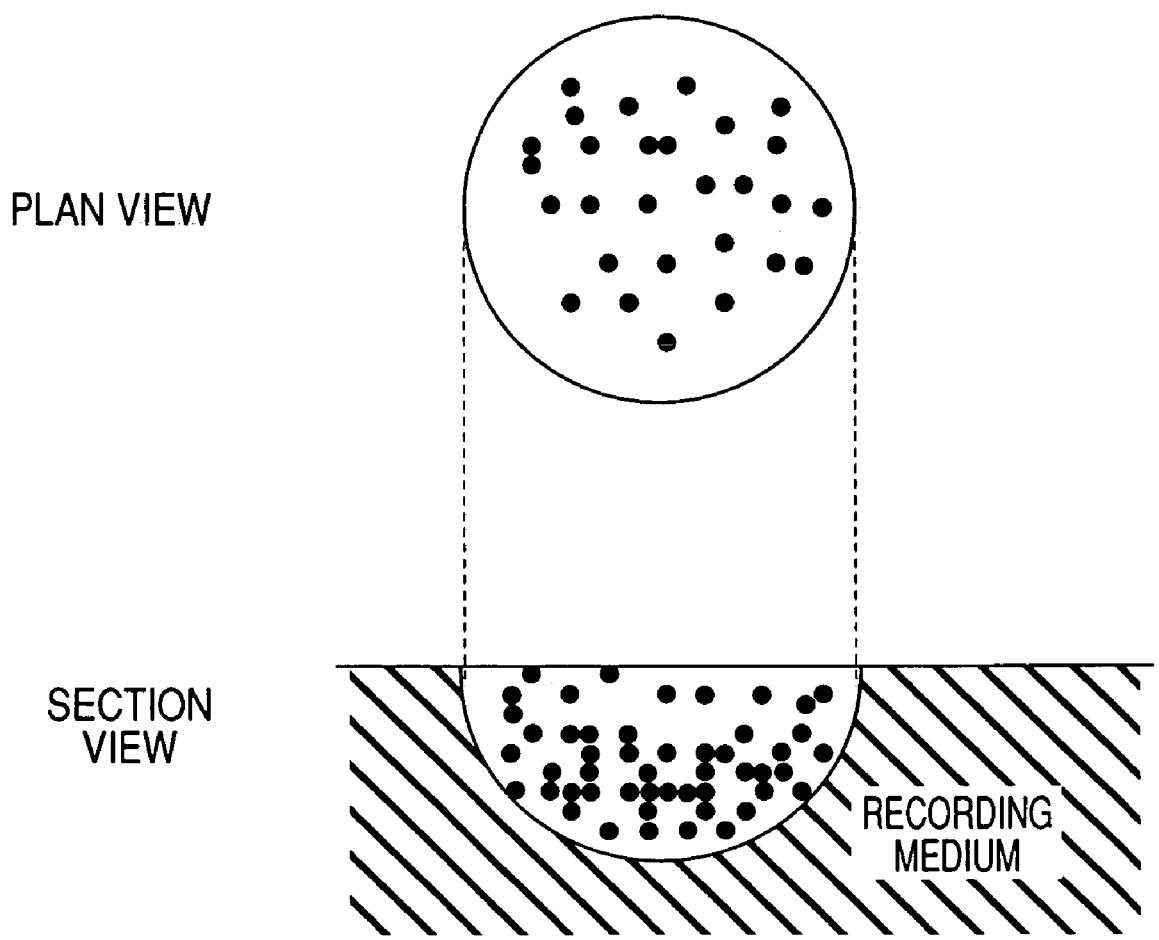
FIG. 8 schematically shows a structure of a dot formed on a recording material with the ink of the present invention.

FIGS. 7 and 8 illustrate a fixation state of a water-based ink of the present invention comprising a liquid medium containing water, a water-dispersible coloring material and a surfactant. In FIGS. 7 and 8, black regions are portions on which the coloring material is fixed. Upper diagrams in FIGS. 7 and 8 are plane model diagrams of a dot being a fixation portion of the coloring material formed from one ink droplet attached to the recording material, seen from above the recording surface of the recording material.

When the water-based ink according to the present invention is applied onto the recording material as an ink droplet, a surfactant in the ink is adsorbed onto the constituent components of the recording material from the surface to the inside of the recording material to increase wettability of the ink droplet to the recording material, thus improving diffusion and permeation of the ink droplet into the surface and interior of the recording material. At the same time, the surfactant is adsorbed onto the water-dispersible coloring material. The liquid medium becomes thin at the periphery of the coloring material as the liquid medium in the ink diffuses and penetrates into the recording medium to cause minute aggregated associations in the water-dispersible coloring material, onto which the surfactant is adsorbed to include the water-dispersible coloring material in a micelle of the surfactant, whereby aggregation of the water-dispersible coloring material are further accelerated. In this way, the coloring material is fixed in a state of association/aggregation near the surface of the recording material. Thus, the recorded image hardly suffers image quality deterioration due to rubbing of the surface (particularly rubbing of the recorded image area immediately after addition of ink droplet onto the recording material), and it can be considered that the recorded image density and image quality are improved because the coloring material remains at the center of the ink droplet in an interspersed form. Furthermore, in view of sticking resistance, the surfactant is adsorbed onto and enters between the growing aggregation/association of the coloring material, so that strong and large aggregation/association of the coloring material is hard to occur. For example, when the ink of the present invention is used in an inkjet recording head, clogging in the nozzle would hardly occur.

As shown in FIG. 8, a large number of small aggregations are formed in the recording material as a result of effective absorption of the surfactant to the water-dispersible coloring material. Specifically, the surfactant is adsorbed onto and acts at an early state of growing aggregation/association of the coloring material where aggregation or association is still minute. Thus the size of the aggregation or association of the coloring material that is adsorbed and attached onto the constituent components of the recording material becomes small. Thus, it can be considered that the ratio of the coloring material not contacting the constituent components of the recording material decreases, so that deterioration of the image quality due to rubbing of the recorded image area is hard to occur, particularly just after ink droplet is applied onto the recording material. From the above, it can be considered that the ink of the present invention creating the fixation state as shown in FIG. 8 on the recording material exhibits an excellent effect by the action of the surfactant to the recording material and the action of the surfactant to the water dispersion material. Furthermore, if the surfactant to be used is a liquid having a poor solubility for the water-dispersible coloring material, permeation and diffusion of the coloring material into the recording object medium is inhibited, and aggregation properties of the coloring material are improved by the action of absorption to the coloring material, thus making it easier to achieve the object of the present invention. Use of a liquid medium having good solubility for the water-dispersible coloring material in the ink is preferable because sticking of the coloring material near a nozzle port discharging ink droplets, for example. Furthermore, to create the fixation state as shown in FIGS. 7 and 8 on the recording material, due care should be taken for the type and usage amount of surfactant, and the type and usage amount of liquid medium used in the ink. The minute aggregations of the coloring material on the recording material in the state shown in FIGS. 7 and 8 preferably have a size of 5 to 20 µm with respect to the dot of 100 µm on the recording material. Furthermore, in this state, because the aggregation is smaller than the threshold of discrimination by human eyes, a plurality of aggregations are recognized as one aggregate by human eyes, and the density of the recorded image is not inferior to that of the recorded image not forming a plurality of small aggregates.

Further, when the recorded image is formed with dots, the dots are hard to be obtrusive, and a recorded image having good quality can be obtained. If the coloring material concentration is 3% by mass or less based on the concentration of the ink, and the content of surfactant in the ink is equal to or greater than the critical micelle concentration, diffusion of the ink on and inside the recording material is improved, and absorption of the surfactant to the coloring material is improved, and therefore the effect of the present invention is secured. Furthermore, a difference between the dynamic interfacial tension and the static interfacial tension of the surfactant to be used is preferably small. This means that the speed of orientation of the surfactant to the interface is high, and the speed of diffusion of the ink liquid medium on and inside the recording material can be increased. Further, because the surfactant tends to be rapidly adsorbed onto the water-dispersible coloring material, it can be orientationally adsorbed onto the water-dispersible coloring material in a sate of small aggregations to form minute aggregations of the water-dispersible coloring material on the recording material, and therefore the effect of the present invention is further improved.

Furthermore, the inventors discovered that if a surfactant that is a poor solvent for the water-dispersible coloring material is selected, the effect of the present invention can be further favorably exhibited. Here, the poor solvent means that the water-dispersible coloring material is precipitated or settled if 1% by mass of water-dispersible coloring material is contained in the solvent. FIG. 7 shows a model diagram where a surfactant being a poor solvent for the water-dispersible coloring material is used. In FIG. 7, the solid black circles represent portions where the coloring material is fixed, and the peripheral blank portion represents an enclosing fixation region formed with the liquid medium containing the surfactant that is a poor solvent for the water-dispersible coloring material. The top face in FIG. 7 is a plane model diagram of a dot as a fixation area of the coloring material formed with one ink droplet applied to the recording material, seen from above the recording surface of the recording material. The sectional view in FIG. 7 schematically shows a dot as a fixation area of the coloring material formed with one ink droplet applied to the recording material. Here, the "enclosed fixation state in the presence of the liquid medium" means that a concentrated image portion including minute interspersed aggregations of the water dispersion material as shown in FIG. 7 is surrounded by the liquid medium around the entire periphery of the concentrated image on and in the recording medium. For the present invention, it is more preferable that a water-soluble crystalline material that is solid under a normal temperature environment is dissolved in the ink in view of "core" formation (described later) on the image formation surface.

The mechanism thereof can be explained in the following way. If a surfactant hard to contain a water dispersion material in a large amount is used in the ink, the interfacial tension of the ink decreases, the ink becomes more wettable with the recording material, more rapidly, and more easily permeates and diffuses into the recording material. At this time, the water-dispersible coloring material is inclined to aggregate according to the properties of the coloring material. While the liquid medium diffuses and permeates on and inside the recording material, separation of the coloring material occurs on and inside the recording material, resulting in fixation of the ink as shown in FIG. 8.

A good combination of a surfactant and a water-dispersible coloring material can be identified as follows, for example. When a desired water-dispersible coloring material solution, for example, a 15% by mass of a water-dispersible coloring material, e.g., about 0.1 g, is dropped onto a selected surfactant solution with a dropper, and the water-dispersible coloring material floats on the surface of the selected surfactant solution in an aggregated state, and it precipitates without dissolving even if it is left standing in a sealed state for a long time, or under an environment of 60° C.

Figure 1:
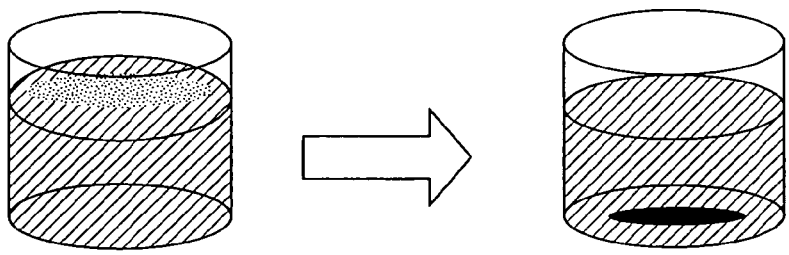
FIG. 1 shows a situation in which a water-dispersible coloring material first separates in a floating state on the surface of a surfactant solution or liquid medium, then it sinks to the bottom with time.
Figure 2:
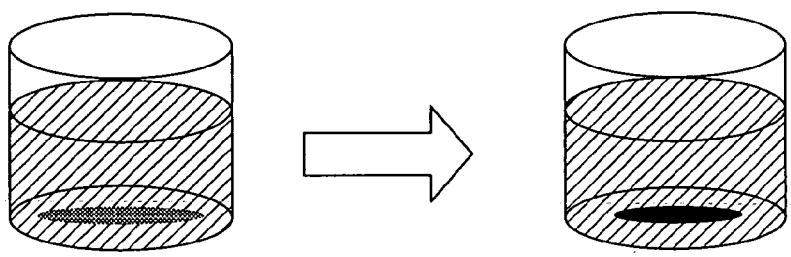
FIG. 2 shows a situation in which a water-dispersible coloring material separates in a precipitated state at the bottom of the surfactant solution or liquid medium and stays in the precipitation state as time elapses.
Figure 3:
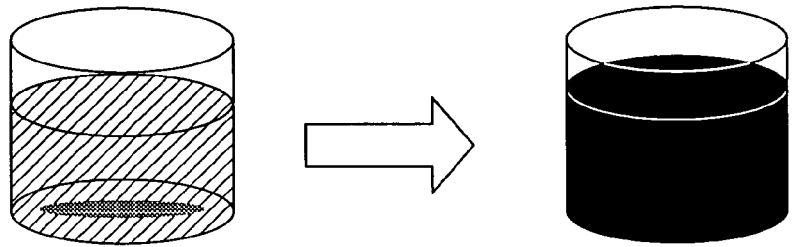
FIG. 3 shows a situation in which the water-dispersible coloring material separates in a precipitation state at the bottom of the surfactant solution or liquid medium but, as time elapses, it diffuses in the solution forming a dissolved state.
Figure 4:
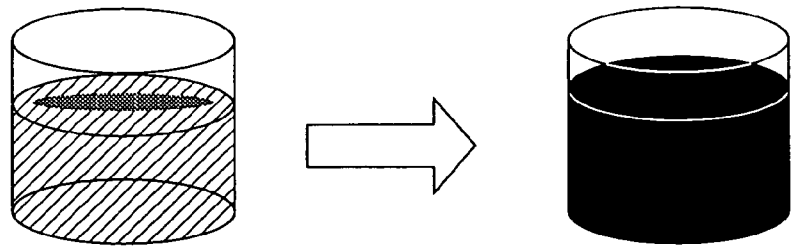
FIG. 4 shows a situation in which the water-dispersible coloring material first separates in a floating state on the surface of the surfactant solution or liquid medium and then, as time elapses, it diffuses in the solution forming a dissolved state.

Desirable combinations are such that the water-dispersible coloring material is separated floating on the surface of the surfactant solution but as time elapses, it precipitates to the bottom as shown in FIG. 1, or such that the water-dispersible coloring material separate and precipitates to the bottom of the surfactant solution and as time elapses, it stays there as shown in FIG. 2, and undesirable combinations are such a case that the water-dispersible coloring material separates and precipitates to the bottom of the surfactant solution but as time elapses, it diffuses and dissolves as shown in FIG. 3, or that the water-dispersible coloring material separates and floats on the surface of the surfactant solution but as time elapses, it diffuses and dissolves as shown in FIG. 4. In FIGS. 1 to 4, the hatched part represents the surfactant solution, and the solid black part represents the water-dispersible coloring material.

Further, if an organic solvent that is a good solvent for the water-dispersible coloring material is contained in the liquid medium of the ink, the present invention becomes further effective. That is, as an ink system containing water, a poor solvent for the water-dispersible coloring material, and an organic solvent that is a good solvent for the water-dispersible coloring material diffuses into the recording material, the water-dispersible coloring material aggregates while diffusing under the influence of the good solvent, and thus formed plural aggregates of the water-dispersible coloring material forms the concentrated image region of the water-dispersible coloring material. Because a large number of aggregates of the water-dispersible coloring material exist within the recording material, rub-resistance is further improved. Furthermore, the aggregates of the water-dispersible coloring material form a properly dispersed assembly.

Here, the good solvent described above is a solvent that can disperse the water-dispersible coloring material stably up to 10% by mass or more, when judged visually. Alternatively, there is a method of discriminating between a good solvent and a poor solvent by comparing light absorbance between the supernatant and bottom portion of a solvent in which the water-dispersible coloring material is disperse. In this case, a solvent of which difference in light absorbance is 10% or less is considered as a good solvent. Another discrimination method of a good combination of a liquid medium and a water-dispersible coloring material by visual observation is, for example, such that a desired water-dispersible coloring material solution (e.g. 15 wt % water-dispersible coloring material aqueous solution) is dropped onto a selected liquid medium with a dropper (e.g. about 0.1 g). If the water-dispersible coloring material neither aggregates floating on nor precipitates in the selected liquid medium, or the water-dispersible coloring material stays dissolved when left for a long time or under the environment of 60° C. in a sealed state, it is a good solvent.

Desirable combinations may include those such that the water-dispersible coloring material separates and precipitates on the bottom of the surfactant solution but as time elapses, it diffuses and dissolves as shown in FIG. 3, or those such that the water-dispersible coloring material separates floating on the surface of the surfactant solution but as time elapses, it diffuses and dissolves as shown in FIG. 4. Undesirable combinations may include those such that the water-dispersible coloring material separates and floats on the surface of the surfactant solution but as time elapses, it precipitates on the bottom" in FIG. 1, or those such that the water-dispersible coloring material separates and precipitates on the bottom of the surfactant solution and stays in that state as time elapses as shown in FIG. 2.

In FIGS. 1 to 4, the hatched part represents the liquid medium here, and the solid black part represents the water-dispersible coloring material.

Figure 9:
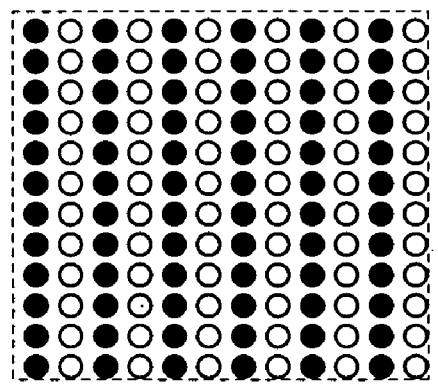
FIG. 9 is a view for schematically explaining an arrangement of ink dots in an image formed with the ink of the present invention.

Furthermore, it has been found out that if the water-based ink of the present invention is used to form an image with a plurality of ink dots in such a manner that each concentrated image region formed with the water-dispersible coloring material is not adjacent each other as shown in FIG. 9, image quality is improved.

Figure 10:
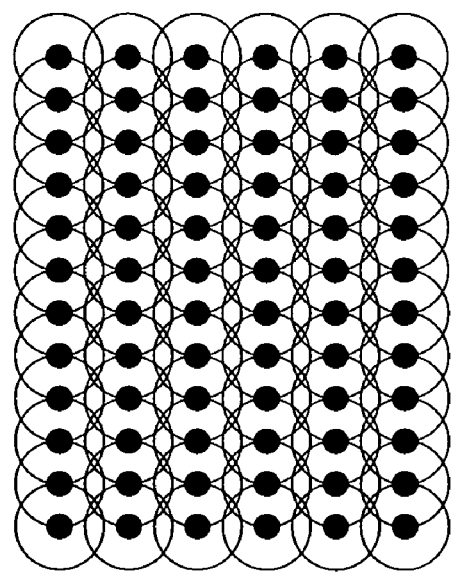
FIG. 10 schematically shows an arrangement of dots formed on the recording material with the ink of the present invention.

Further, it has been found out that when an image is formed with a plurality of dots using a water-based ink that forms a concentrated image with the coloring material at the center with an enclosing fixation region formed with the liquid medium around the entire periphery of the concentrated image region including inside the recording material, in such a manner that concentrated image regions formed with the water-dispersible coloring material would not contact each other as shown in FIG. 10, image quality is further improved.

Further, it has been found that out when a recorded image is formed with a water-based ink that forms a concentrated image region with the coloring material at the center and an enclosing fixation region formed with the liquid medium in the entire periphery of the concentrated image region including inside the recording material, in such a manner that longitudinal resolution ≠ lateral resolution, the coloring material is more easily separated from the liquid medium containing the surfactant, and the effect of the ink of the present invention can be further improved.

Meaning of "adding a plurality of ink droplets onto the recording material in such a manner that concentrated image regions formed with the coloring material are not adjacent to one another" is, for example, that areas where no ink droplets are applied thereto are provided between the ink dots as shown in FIG. 9. FIG. 9 is a model diagram depicting the recording surface of the recording material as a plan view, wherein the black circle represents an area having ink droplets applied thereto, and the white circle represents an area having no ink droplets applied thereto.

Figure 14:
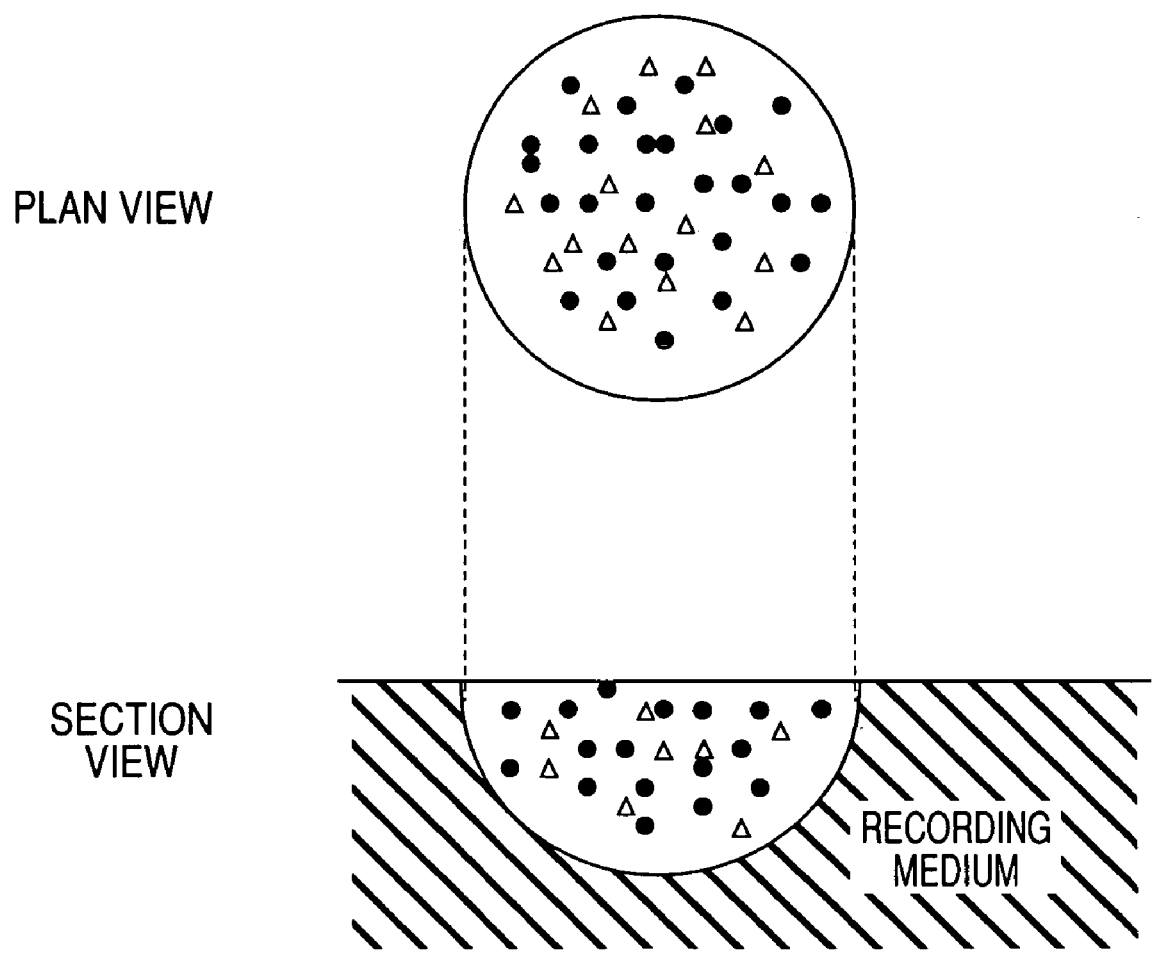
FIG. 14 schematically shows a fixed dot formed by superimposing ink droplets of the ink of the present invention on the recording material using an inkjet recording apparatus, seen from the top surface and the side of the recording material. Here, black circles represent minute aggregations of the coloring material initially discharged onto the recording material, and void triangles represent minute aggregations of the coloring material discharged to superimpose.

As shown in FIG. 14, when an water-based ink that forms a plurality of minute aggregations of the coloring material interspersed on the recording material is superimposed on the recording material, the coloring material in the ink discharged later forms minute aggregations in areas where the coloring material did not form minute aggregations by the former discharge shown in FIGS. 7 and 8, whereby not only the print density is improved, but also the coloring material is hard to be stripped by rubbing to improve rub-resistance because the coloring material deposits and is adsorbed on the recording material constituent components in a state of minute aggregations, and thus both the print density and rub-resistance are obtained.

Furthermore, if the content of the surfactant in the ink is at a critical micelle concentration or above with the coloring material of 3% by mass (preferably 2% by mass or less), not only diffusion of the ink on and inside the recording material is improved, but also aggregation of the water-dispersible coloring materials is improved, and thus the effect of the present invention is further improved.

Figure 11:
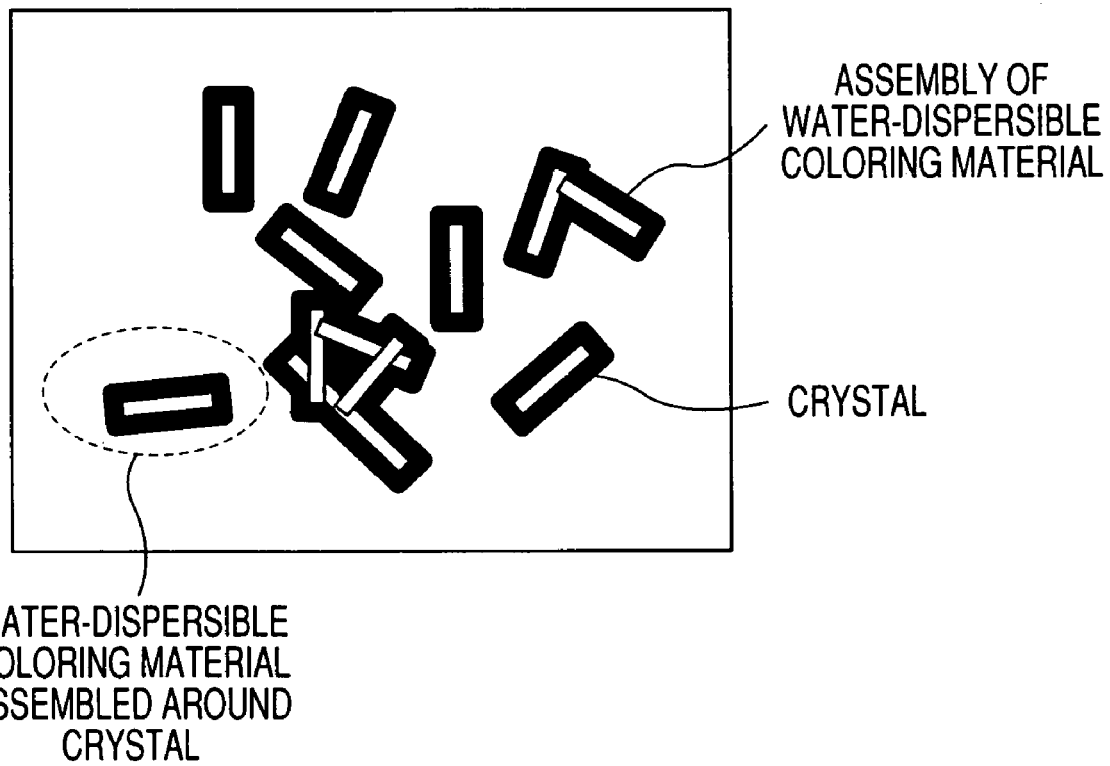
FIG. 11 is a view for explaining formation of aggregates in the ink of the present invention.
Figure 12:
FIG. 12 illustrates formation of aggregates of the water-dispersible coloring material.

The water-based ink of the present invention preferably includes a water-soluble crystalline material (crystal-forming component) that is solid under a normal temperature environment in addition to the surfactant described above. Ink of a preferred embodiment contains a mixture of a water-dispersible coloring material, a liquid medium (aqueous medium), a surfactant having the above action and a water-soluble crystal-forming component in a stable state. When such an ink is left standing and the amount of water in the ink decreases by evaporation, the concentration of the water-soluble crystal-forming component in the ink reaches a saturation concentration in the ink, and the crystal-forming component starts to precipitate crystals. At the same time, the water-dispersible coloring material also reaches a saturation concentration, and the dispersion state of the coloring material becomes unstable and inclined to aggregate. If these two states, namely crystal precipitation and aggregation of the water-dispersible coloring material occurs at a time in the ink, the water-dispersible coloring material forms dispersed assemblies with cores of precipitated crystals (FIG. 11). Dispersed assemblies of the coloring material with crystal cores in the ink prevent formation of a network of the water-dispersible coloring material in the ink that occurs with an ordinary ink using a water-dispersible coloring material (FIGS. 1 and 2). In addition, as the concentration of the surfactant having the above action increases, aggregation of the water-dispersible coloring material is enhanced. Dispersed assemblies of the coloring material with crystal cores are hard to form this network, and therefore do not bring about strong sticking as with the dispersed coloring material alone, and thus sticking resistance and clogging resistance are improved. Further, since the assemblies have water-soluble cores, for example, if clogging occurs in the vicinity of a nozzle of an inkjet head with the aggregates, the clogging state can be easily restored by external and internal actions of the restoration operation such as suction, application of pressure and the like.

Figure 13:
FIG. 13 illustrates a state when aggregates of the water-dispersible coloring material in the present invention are deposited on the recording material.

Furthermore, on the recording material, the amount of water in the ink applied to the recording material is decreased by evaporation and permeation, water-dispersible coloring material assemblies having crystal cores are formed on the surface of the recording material, and at the same time, the water-dispersible coloring material strongly interacts chemically and physically with cellulose fibers constituting the recording material. Therefore fastness such as water resistance is improved (FIG. 13).

The crystal-forming component contained in the ink of the present invention is a material that is solid under a normal temperature environment and is soluble in water. The material is a crystalline material having crystallinity such as needle or spherical crystallinity, and dissolves in water and crystalizes again if the amount of water is decreased from the aqueous solution of the material by heating or the like. The materials include, for example, urea, ethylene urea, ε caprolactone, succinimide, thiourea, dimethylolurea and 2-pyrolidone, which may be substituted with at least one of ethylene oxide, propylene oxide and alkyl. Furthermore, they preferably have cyclic structures in terms of stability of crystal components in the ink. One type of crystal-forming component may be used alone, or two or more types of crystal-forming component may be used in combination as required. Being solid under the normal temperature environment is required to exhibit the effect of the invention due to precipitation of crystal components of the present invention. The normal temperature environment refers to a range of 20 to 25° C., but in consideration of usability, the melting point of the crystal-forming component having a solid form under the normal temperature environment is 30° C. or greater, preferably 60° C. or greater, further preferably 120° C. or greater. Its content in the ink may be selected depending on the type of recording material, but is preferably 1 to 30% by mass, further preferably 2 to 20% by mass based on the total mass of the ink. If the content is too low, the effect of the present invention cannot be exhibited, and if the content is too high, dischargeability is adversely affected when the ink is used in inkjet recording.

Further, if the ink of the present invention contains an aqueous medium, a water-dispersible coloring material and crystal-forming component as the ink components, use of an organic solvent that can dissolve the crystal-forming component in the ink can provide more preferable effect. According to the ink of the present invention in which such an organic solvent is used, not only the water-dispersible coloring material easily forms assemblies with crystal cores, but also the aggregates can exist independently so that sticking resistance is effectively exhibited. Particularly, organic solvents, those that are hardly volatile under the normal temperature environment, such as glycerin and triethylene glycol, are preferable.

Further, the relation between the organic solvent and the crystal-forming component is preferably such that the content of crystal-forming component is equal to or greater than a saturation concentration with respect to the content of the organic solvent used in the selected ink. This is because assemblies of the water-dispersible coloring material having crystals of the crystal-forming component as cores are easily formed. Accordingly, for exhibiting the mechanism of the present invention, it is especially preferable that the saturation concentration of crystal-forming component in the organic solvent is equal to or less than that in water used.

Furthermore, if the content of crystal-forming component in the ink is equal to or less than a saturation concentration with water in the ink, and equal to or greater than a saturation concentration with the organic solvent in the ink, the effect of the present invention can be further favorably exhibited. That is, the crystal-forming component is dissolved well in the ink, but as the volatile components in the ink evaporate, crystal formation of the crystal-forming component occurs quickly.

The inventors also found out-that selection of a coloring material having a free carboxyl group as a main water-soluble group, rather than a coloring material having mainly a free sulfone group as a water-soluble group, further improves the effect of the present invention. Further, incorporation of the crystal-forming component can further improve these effects.

Next, respective constituent components of the ink of the present invention, with which excellent effects can be obtained by the mechanism described above, will be described in further detail.

As described previously, the coloring material that is a constituent component of the present invention cannot be hardly dispersed or dissolved in water by itself, but can be only dispersed in water by the chemical and physical action of a compound having water-soluble groups such as a surfactant and a polymer. Alternatively, it may be a coloring material that has become water-dispersible owing to chemically bonded hydrophilic groups such as sulfone and carboxyl groups introduced by surface-treating the water-dispersible coloring material with a compound having low-molecular hydrophilic groups or oxidizing the surface of the coloring material. It may be an emulsion or capsule of the coloring material included in a polymer etc.

For the water-dispersible coloring material, for example, inorganic carbon black pigments such as furnace black, lamp black, acetylene black and channel black, which are either commercially available products or products specifically prepared, may be used alone or in combination of two or more types.

As organic pigments, insoluble azo pigments, derivatives of soluble azo pigment vat dyes, phthalocyanine pigments, quinacridone pigment, perylene pigments, isoindolynone pigments, imidazolone pigments, pyranthrone pigments, thioindigo pigments, condensed azo pigments, thioindigo pigments, diketopyrrolopyrrol pigments and other pigments may be used. They may be used alone or in combination of two or more types.

To disperse the coloring material in water, for example, a hydrophilic group is bonded to the surface of the coloring material via a diazonium group; the surface of the coloring material is oxidized with hypochlorous acid or the like and a hydrophilic group is reacted therewith; the coloring material is included in a surfactant or polymer forming an emulsion or capsule; or a dispersant such as a surfactant or polymer is physically adsorbed onto the surface of the water-dispersible coloring material.

Dispersants include, for example, resins such as random or block-polymerized styrene acrylic acid copolymers and styrene maleic acid copolymers; nonionic surfactants and anionic surfactants capable of providing a water dispersion state using a micelle form or emulsion form; and block copolymers, random copolymers and graft copolymers composed of at least two monomers (at least one of which is a hydrophilic monomer) selected from styrene, styrene derivatives, vinyl naphthalene, vinyl naphthalene derivatives, aliphatic alcohol esters and the like of $\alpha,\beta$-ethylene unsaturated carbonic acid, acrylic acid, acrylic acid derivatives, maleic acid, maleic acid derivatives, itaconic acid, itaconic acid derivatives, fumaric acid, fumaric acid derivatives, vinyl acetate, vinyl pyrolidone, acryl amid and derivatives thereof, and salts thereof. Above all, especially preferable dispersants in carrying out the present invention are block copolymers. This is because when a water-dispersible coloring material is dispersed with a block copolymer, variations between individual water-dispersible coloring materials is reduced and stable inks are easily provided.

Methods for producing these polymers are disclosed in Japanese Patent Application Laid-Open No. H05-179183, Japanese Patent Application Laid-Open No. H06-136311, Japanese Patent Application Laid-Open No. H07-053841, Japanese Patent Application Laid-Open No. H10-87768, Japanese Patent Application Laid-Open No. H11-043639, Japanese Patent Application Laid-Open No. H11-236502 and Japanese Patent Application Laid-Open No. 11-269418.

Particularly, in consideration of stability with time of the ink under a variety of environments and favorable effects of the present invention, dispersants using resins are more preferable, and dispersants using block-polymerized resins are especially preferable.

One type of resin dispersant may be used alone, or two or more types of resin dispersants may be used in combination as required, and a preferable amount of resin dispersant is in the range of 0.5 to 10% by mass, preferably in the range of 0.8 to 8% by mass, more preferably in the range of 1 to 6% by mass. If the content of dispersant is greater than the range, it may be difficult to maintain a desired ink viscosity.

The content of coloring components of the water-dispersible coloring material in the ink may be in any range as long as it allows minute aggregates formation on the recording material of the present invention, and is not limited to a specific range. It is preferably less than 3% by mass, more preferably 2% or less by mass. The lower limit of the content of these pigments may be set according to a desired image density. Furthermore, if the content of the material is high, minute aggregations are hard to be formed on the recording material, and thus it is difficult to obtain the effect of the present invention.

Furthermore, if the water-dispersible coloring material is an emulsion or microcapsule dispersed with a resin stained with a dye, or an emulsion or microcapsule dispersed with a resin and the like including a dye, dyes that are used in conjunction with the resin include, for example, coloring dyes such as 40 of C.I. Basic Yellow, 1, 13 and 27 of Basic Red, 7, 10, 11, 15 and 25 of C.I. Basic Violet, 1, 7 and 54 of C.I. Basic blue, 11, 82 and 186 of C.I. Disperse Yellow, 7 of C.I. Disperse Blue, 49 of C.I. Solvent Red, 44 of C.I. Solvent Yellow, 5 of C.I. Solvent Blue, 9, 30 and 52 of C.I. Acid red, 7 of C.I. Acid Yellow, 7 of C.I. Acid Yellow, 36 of C.I. Acid Violet, 9, 71 and 22 of C.I. Acid, and 85 of C.I. Direct Yellow, and fluorescent brighteners such as C.I. Fluorescent Brightener 162, 174, 219, 226, 239 and 363, and C.I. Brightening Agent 3034, 48, 52 and 135. These dyes may be adjusted so that the obtained ink composition has a desired color by using the dye alone or in mixture of two or more types, and the color of the obtained ink composition is not specifically limited.

Furthermore, resins that are used include a styrene(meth) acrylonitrile copolymer such as an α-methylstyrene-acrylonitrile copolymer and an α-methylstyrene-methacrylonitrile copolymer; a styrene-(meth)-acrylic acid copolymer such as an α-methylstyrene-acrylic acid copolymer and an α-methylstyrene-methacrylic acid copolymer; a (meth) acryl-(meth)acrylic acid ester copolymer such as an acrylic acid-methyl methacrylate copolymer and an acrylic acid-methyl methacrylate copolymer; a (meth)acrylic acid ester-N-vinylpyrrolidone copolymer such as an ethyl acrylate-N-vinylpyrrolidone copolymer; a (meth)acrylamide-vinyl acetate copolymer such as an acrylamide-vinyl acetate copolymer; a (meth)acrylamide-(meth)acrylic acid ester copolymer such as an acrylamide-methyl acrylate copolymer; a (meth)acrylic acid ester-(meth)acrylic acid ester-(meth)acrylonitrile copolymer such as an ethyl methacrylate-butyl acrylate-acrylonitrile copolymer, a methyl acrylate-acrylonitrile-methacrylonitrile copolymer, a butyl acrylate-ethyl methacrylate-acrylonitrile copolymer; a styrene(meth)acrylic acid ester-(meth)acrylic acid ester-(meth) acrylonitrile copolymer such as a styrene-methyl methacrylate-acrylonitrile copolymer and a chlorostyrene-ethyl acrylate-methacrylonitrile copolymer; a styrene-(meth)-acrylonitrile copolymer such as a styrene-acrylic acid-acrylonitrile copolymer and a styrene-acrylic acid-acrylonitrile copolymer; a styrene-(meth)acrylic acid-(meth)acrylic acid ester copolymer such as a styrene-acrylic acid-methyl acrylate copolymer; a (meth)acrylic acid-(meth)acrylic acid ester-(meth)acrylonitrile copolymer such as a methacrylic acid-ethyl acrylate-acrylonitrile copolymer, and they may be used alone or in mixture of two or more types. Among them, (meta)acrylate-N-vinyl pyrolidone based copolymers, styrene-(meta)acrylic acid-(meta)acrylonitrile based copolymers and the like are preferable resins in terms of stainability and coloring characteristics.

The amount of the above dye to be blended varies depending on the type of the dye, and therefore cannot be generally determined, and may be adjusted so that the ink composition has a desired color, but the amount is usually 0.1 parts by weight or greater, preferably 1.0 part by weight or greater based on 100 parts by weight of the resin for obtaining an ink composition excellent in coloring characteristics, and 10 parts by weight or less, preferably 8 parts by weight or less based on 100 parts by weight of the resin for allowing the dye to be sufficiently incorporated in the resin.

Typical forms of the colored resin include dispersions of resin colored with a dye.

The resin solid content contained in the dispersions of resin is adjusted to be 5% by weight or greater, preferably 10% by weight or greater for obtaining an ink composition excellent in coloring characteristics. Furthermore, the resin solid content in dispersions of resin is 60% by weight or less, preferably 50% by weight or less for preventing the situation in which the viscosity is so high that usability is compromised.

Dispersions of resin include, for example, resin emulsions and resin suspensions.

The resin emulsion can be obtained by emulsifying a resin monomer in water using an emulsifier, dispersing the resin monomer, polymerizing the resin monomer using a polymerization initiator, and then staining the resin using a dye.

The amount of the raw material monomer to be blended is adjusted so that the resin solid content in the obtained resin emulsion equals the resin solid content in dispersions of resin. Emulsifiers include, for example, anioic surfactants such as sodium lauryl sulfate, polyoxyethylene alkyl ether sulfate, sodium polyoxyethylene alkylsulfonate, sodium dodecylbenzene sulfonate, alkaline salts of a styrene-acrylic acid copolymer, sodium stearate, sodium alkylnaphthalene sulfonate, alkyldiphenylether sodium disulfonate, monoethanolamine laurylsulfate, triethanolamine laurylsulfate, ammonium laurylsulfate, monoethanolamine stearate, sodium stearate, sodium lauryl sulfate, monoethanolamine salts of a styrene-acrylic acid copolymer, and polyoxyethylene alkylether phosphate ester; nonionic surfactants such as polyoxyethylene oleyl ether, polyoxyethylene lauryl ether, polyoxyethylene nonylphenyl ether, polyoxyethylene alkyl ether phosphate ester, polyoxyethylene sorbitan monostearate, polyethylene glycol monolaurate; cationic surfactants such as alkyl quaternary ammonium salts and their ethylene oxide adducts; alkyl betaines such as betaine alkyl dimethylaminoacetate; dual surfactants such as alkyl imidazoline, and they may be used alone or in mixture of two or more types. The amount of the emulsifier to be blended is 0.1 parts or greater, preferably 0.3 parts or greater based on 100 parts of raw material monomer for carrying out stable emulsion polymerization, and 30 parts or less, preferably 20 parts or less based on 100 parts of raw material monomer for preventing degradation in water resistance due to an excessive amount of emulsifier.

The polymerization initiators include, for example, ammonium persulfate, potassium persulfate and hydrogen peroxide water, and they may be used alone or in mixture of two or more types.

The viscosity of the obtained resin emulsion (25° C.) is 500 CPS, preferably 200 CPS or less for effectively staining the resin in the resin emulsion and obtaining an ink composition excellent in coloring characteristics. Furthermore, the viscosity of the resin emulsion can be adjusted by adjusting the molecular weight of the resin, or adding water after obtaining the resin emulsion. Furthermore, when the resin is stained using a dye to adjust the resin emulsion, for example one type or two or more types of emulsifiers such as anionic surfactants such as sodium alkylnaphthalene sulfonate, sodium B-naphthalene sulfonate, sodium dialkylsulfosuccinate, sodium polyoxyethylene alkylether sulfate, sodium polyoxyethylene lauryl sulfate, salts of a styrene-acrylic acid copolymer, polyoxyethylene alkyl ether phosphate salts; cationic surfactants such as polyoxyethylene alkyl betaine; nonionic surfactants such as polyoxyethylene stearate and polyoxyethylene alkyl ether may be used as required within the bounds of not hampering the purpose, so that, emulsification stability of the resin can be improved and the resin is stained stably.

Resin suspensions can be obtained by dispersing in water resin particles obtained by crushing a colored resin block stained with a dye by, for example, a ball mill, sand mill, jet mill, ultrasonic dispersion apparatus, roll mill, hammer mill, kneader or the like. If resin suspensions are used, the particle size of resin particles is 3 μm or less, preferably 1 μm or less for improving storage stability and preventing clogging at a nozzle throat. When the resin particles are dispersed in water, a dispersant is preferably used. The dispersants include, for example, styrene-acrylic acid copolymers, styrene-maleic acid copolymers, polyoxyethylene alkyl acetates, polyoxyethylene alkyl phosphates, polyoxyethylene alkyl ethers and polyoxyethylene fatty amides, and they may be used alone or in mixture of two or more types. The amount of the dispersant to be blended is 0.1 parts or greater, preferably 0.3 parts or greater based on 100 parts of colored resin for maintaining a stable and uniform dispersion state of resin particles in water. It is 200 parts or less, preferably 100 parts or less based on 100 parts of colored resin in order that the viscosity of the ink composition is not too high to ensure good dischargeability.

The colored resin may be used as resin dispersions such as a colored emulsion and resin suspensions. In this case, the solid content of the colored resin is 0.5% by weight or greater, preferably 1% by weight, and 15% by weight or less, preferably 10% by weight or less in consideration of color development on normal paper.

Figure 5:
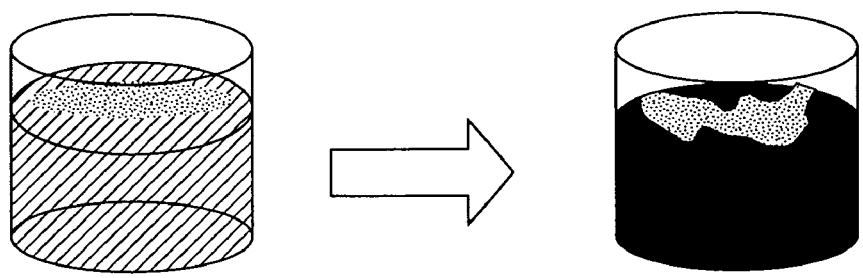
FIG. 5 shows a situation in which microcapsules of a water-dispersible coloring material aggregate and separate on the surface of the liquid medium but as time elapses, the coloring material diffuses into the solution forming a dissolved state, and the capsule portions are aggregating on the surface of the liquid medium.
Figure 6:
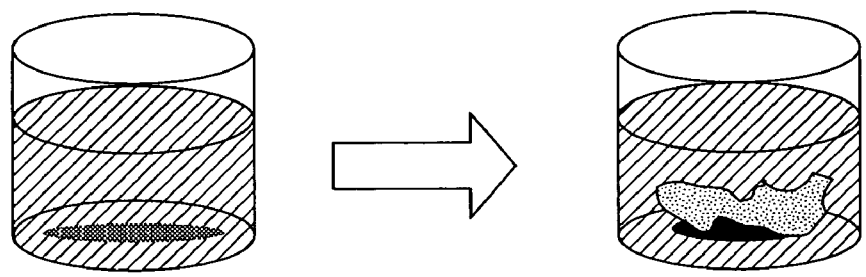
FIG. 6 shows a situation in which microcapsules of a water-dispersible coloring material separate in a precipitation state on the bottom of the liquid medium but, as time elapses, the capsule portions separate from the coloring material and precipitate.

Furthermore, care should be taken for the solvent that is used here, because some types of solvents dissolve components of the resin and the like constituting a capsule or emulsion or separate the components from the coloring material, for example brings about the situation in FIGS. 5 and 6. Here, in FIGS. 5 and 6, the solid black portion represents the dispersed or dissolved state of the coloring material, and the gray portion represents the capsule and emulsion broken to release the components.

Furthermore, if the content of water-dispersible coloring material in the ink is too high, some of water-dispersible coloring material cannot aggregate in the ink when assemblies of the water-dispersible coloring material are formed around core crystals. In the present invention, one type of water-dispersible coloring material may be used alone, or two or more types of water-dispersible coloring materials may be used in combination.

In the present invention, a water-soluble coloring material can be used in conjunction as long as it does not hamper formation of minute aggregates.

The liquid medium containing components such as the water-dispersible coloring material is preferably a mixture of water and a water-soluble organic solvent. The water-soluble organic solvents include, for example, amides such as dimethylformamide and dimethylacetamide; ketones such as acetones; ethers such as tetrahydrofuran and dioxane; polyalkylene glycols such as polyethylene glycol and polypropylene glycol; alkylene glycols in which the alkylene group has 2 to 6 carbon atoms such as ethylene glycol, propylene glycol, butylene glycol, triethylene glycol, 1,2,6-hexanetriol, thiodiglycol, hexylene glycol, diethylene glycol; glycerin; lower alkyl ethers of polyhydric alcohols such as ethylene glycol monomethyl (or ethyl) ether, diethylene glycol monomethyl (or ethyl) ether, triethylene glycol monomethyl (or ethyl) ether; N-methyl-2-pyrrolidone, 1,3-dimethyl-2-imidazolidinone, triethanolamine, sulforane, dimethylsulfoxide, 2-pyrrolidone, or the like, and crystalline solvents, for example, urea, ethylene urea, ε-caprolactone, succinimide, thiourea, dimethylolurea, and 2-pyrrolidone, and at least one type of ethylene oxide, propylene oxide and alkyl may be added to these compounds as constituents. Furthermore, they preferably have a cyclic structure in terms of stability of the crystal component in the ink. One type of crystal-forming component may be used alone, or two or more types of crystal-forming component may be used in combination as required.

Furthermore, those being solid under a normal temperature environment can favorably exhibit the effect of the invention by precipitation of the crystal component of the present invention. The normal temperature environment refers to the range of 20 to 25° C. but in consideration of usability, the melting point of the crystal-forming component having a solid form under the normal temperature environment is 30° C. or greater, preferably 60° C. or greater, further preferably 120° C. or greater. The content of the crystal-forming component in the ink may be selected according to the type of recording material, but is preferably 1 to 30% by mass, further preferably 2 to 20% by mass based on the total mass of ink. If the content is too low, the effect of the present invention cannot be exhibited, and if the content is too high, dischargeability is adversely affected when the ink is used in inkjet recording. They may be used alone or in combination of two or more types as required.

Generally, the content of the water-soluble organic solvent described above is preferably 1 to 40% by mass, more preferably 3 to 30% by mass based on the total amount of ink.

Furthermore, the content of water in the ink is preferably selected from the range of 30 to 95% by mass. If the content is less than 30% by mass, it may be impossible to ensure solubility of water-soluble components, and the viscosity of the ink increases. On the other hand, if the content of water is greater than 95% by mass, the amount of evaporated components may be so large that adequate sticking characteristics cannot be satisfied.

For the surfactant that is preferable as a constituent component of the ink of the present invention, a variety of surfactants may be used as required, e.g., a surfactant that can contain a water-soluble coloring material in a larger amount than it does a water-dispersible coloring material, or a surfactant that can contain a coloring material having a free sulfonic group as a main water-soluble group in a larger amount than it does a coloring material having free carboxylic acid as a main water-soluble group.

Preferable surfactants are nonionic or anionic surfactants. This is because cationic surfactants tend to compromise coloring characteristics and reliability. In consideration of stability of the coloring material in the ink, further preferable are nonionic surfactants and ampholytic surfactants and especially preferably, nonionic surfactants are used.

A nonionic surfactant, which itself does not undergo phase separation from an aqueous solution in a state of aqueous solution, is preferable. Use of a nonionic surfactant that separates from an aqueous solution is not preferable because the resulting ink becomes unstable. This indicates that a nonionic surfactant that apparently dissolves or uniformly disperses in water is preferably used, and particularly it was found out that a nonionic surfactant that becomes an emulsion in an aqueous solution is preferably selected.

Further, the content of nonionic surfactant in the ink is preferably no greater than the upper limit allowing an emulsion state in an aqueous solution because the adsorption effect of the present invention can be favorably exhibited.

Among surfactants for use in the present invention, surfactants suitable for the present invention are those having a HLB of 13 or less. Generally, if the HLB is greater than 13, water solubility characteristics are enhanced, and thus the mechanism of the present invention may be hard to be exhibited.

Furthermore, among surfactants for use in the present invention, those in which the difference between the dynamic interfacial tension and the static interfacial tension is small are preferable. This is because if the interfacial tension difference is large, the effect of the present cannot be effectively exhibited.

Furthermore, surfactants suitable for the present invention are those having a liquid state under an ordinary ink use environment. This is because those having a solid state tend to be solidified on a recorded image obtained under a use environment and near an ink discharge port even though they are dissolved in the ink during preparation of the ink, and thus it may be difficult to obtain the effect of the present invention. Here, the ordinary ink usage environment refers to the range of 20 to 40° C.

In contrast to the content of water-dispersible coloring material described previously, specifically the content of surfactant in the ink of the present invention is preferably 1% by mass or greater, further preferably 1 to 3% by mass based on the total mass of ink. If the content is less than 1% by mass, it may be impossible to obtain desired minute aggregations of the water-dispersible coloring material on the recording material in image formation, and if the content is greater than 3% by mass, it may be impossible to achieve a desired balance of print quality, for example a good balance among performances such as the image density, fixation characteristics of images, and prevention of occurrence of feathering being a whisker-like smear.

Among surfactants meeting the requirements described above, especially preferable surfactants as a constituent component of the ink of the present invention are those excellent in adsorptivity to the recording material and the water-dispersible coloring material, and the surfactants excellent in adsorptivity include, for example, those having an acetylene group in the structure, and those having an alkyl chain at the terminal. The alkyl chain has preferably 8 or more carbon atoms. This is because if the number of carbon atoms is too small, adsorptivity is degraded. For the hydrophilic group, an ordinary ethylene oxide may be used, and the addition numbers of the adsorption group and the ethylene oxide are adjusted to select a surfactant for use in the ink of the present invention. Furthermore, the surfactant preferably has a propylene oxide in the structure, preferably at the ethylene oxide terminal.

The surfactants include, but are not limited to, compounds expressed by the following general formula (I) and compounds listed in the following formulas (II) to (VII).

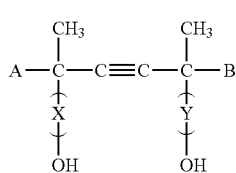
(I)

In the above general formula (I), A and B represent independently $C_nH_{2n+1}$ (n is an integer of 1 to 10), and X and Y each represent an open ethylene oxide unit and/or an open propylene oxide unit.

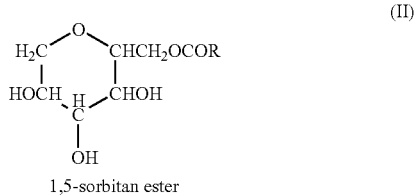
1,5-sorbitan ester (II)

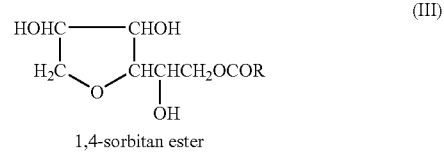
1,4-sorbitan ester (III)

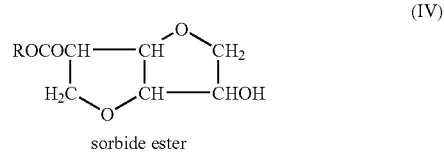
sorbide ester (IV)

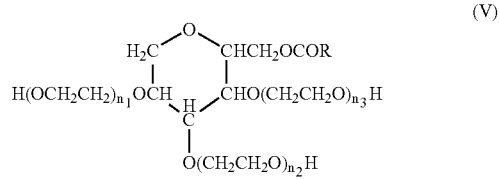
(V)

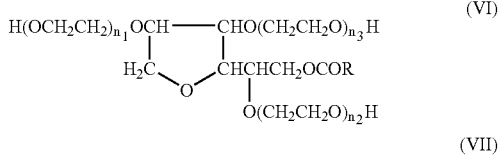
(VI)

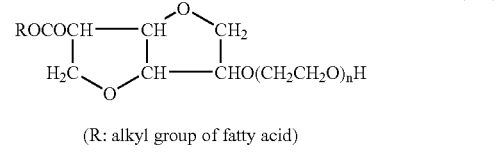
(VII)

(R: alkyl group of fatty acid)

Among the nonionic surfactants expressed by the above general formula (I), especially preferable are compounds expressed by the following general formula (VIII).

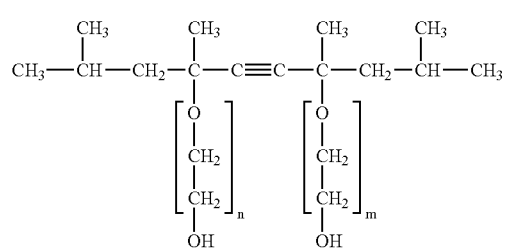

m and n are integers.

Preferably, a monovalent alcohol is further used in combination in the ink of the present invention in terms of stability of the ink. The monovalent alcohol prevents microbial growth such as fungi having influences on clogging and the like. Moreover, the monovalent alcohol has favorable effects on evaporation and permeation into the recording material when the ink is applied onto the recording material, and it is therefore effective as a component for more favorably exhibiting the effect of the present invention. The content of monovalent alcohol in the ink of the present invention is 0.1 to 20% by mass, preferably 0.5 to 10% by mass based on the total mass of ink. Specific examples of monovalent alcohols that can be used as an ink component of the present invention include, for example, ethanol, isopropyl alcohol and n-butanol. And they may be used alone or in combination of two or more types as required.

The ink of the present invention may further contain various additives such as a water-soluble organic solvent, a surfactant, a rust-preventive agent, a preservative, a fungicide, an anti-oxidizing agent, an anti-reducing agent, an evaporation promoter, a chelating agent, a water-soluble polymer and a pH adjustor as required.

Preferably, the ink of the present invention has a surface tension of 40 mN/m or less. This is because for exhibition of the mechanism described previously, for example, it is more preferable that droplets spread after recording for exhibiting the effect. Furthermore, the pH of the ink of the present invention is preferably 6.5 or greater in terms of stability of the ink.

Further, in the ink of the present invention, a plurality of alkali metal ions are preferably used in combination as counter ions of the coloring material. When the ink is used in inkjet recording, stability of the ink is improved if the alkali metal ions are used in combination with the ink. The alkali metal ions may include $Li^+$, $Na^+$ and $K^+$.

Furthermore, it is preferable that the alkali metal ions and nitrogen-containing compounds such as ammonia and amine are used in combination in the ink because not only stability of the ink but also dischargeability of the ink from a nozzle is improved when the ink is used in inkjet recording.

Methods and apparatuses suitable for recording using the ink of the present invention include a method and apparatus in which heat energy corresponding to a recording signal is given to an ink in a chamber of a recording head, and droplets are generated with the heat energy.

The water-based ink of the present invention constituted as described above may be used as a usual ink for stationery, but is especially effective when it is used in inkjet recording. Inkjet recording methods include a recording method of acting mechanical energy on an ink to discharge droplets, and a method of applying heat energy to an ink to discharge droplets by foaming of the ink, but the ink is particularly suitable when it is applied to the inkjet recording method of discharging the ink using a foaming phenomenon of the ink by heat energy, and it has characteristics such that discharge is quite stabilized, and satellite dots and the like never occur. In this case, however, thermal properties (e.g. specific heat capacity, heat expansion coefficient, heat conductivity, etc.) may be adjusted.

Further, for solving problems of water resistance of the ink of a print recording matter when the ink is recorded on normal paper or the like, and improving matching to a head for inkjet, the ink of the present invention is desirably adjusted so that as properties of the ink itself, the surface tension at 25° C. is 30 to 40 mN/m, and the viscosity is 15 cP or less, preferably 10 cP or less, more preferably 5 cP or less. Thus, for adjusting the ink to have the above properties, and solving problems with normal paper, the content of water in the ink of the present invention 50 to 98% by mass, preferably 60 to 95% by mass.

The present invention is applicable to an inkjet head, an ink storage container in which the ink is stored or an ink for filling the container. Particularly, the present invention provides excellent effects with a recording head and recording apparatus of a bubble jet system among ink-jet recording systems.

For its typical configuration and principle, for example, basic principles disclosed in U.S. Pat. No. 4,723,129 and U.S. Pat. No. 4,740,796 are preferably used. This system can be applied to any of so called an on-demand type and continuous type but particularly, the on-demand type is effective because at least one drive signal corresponding to record information and giving a rapid increase in temperature beyond nuclear boiling is applied to an electrothermal converter placed in accordance with a sheet or liquid channel in which the ink is held, whereby heat energy is produced in the electrothermal converter, film boiling is caused on the thermal action face of the recording head and as a result, a bubble in the ink can be formed in correspondence to the drive signal on a one-to-one basis. The ink is discharged through a discharging opening by growth and contraction of the bubble to form one droplet. It is more preferable that the drive signal has a pulse shape because growth and contraction of air bubbles occurs instantly and appropriately, and therefore discharge of the ink particularly excellent in responsibility can be achieved. As the driving signal having a pulse shape, those described in U.S. Pat. No. 4,463,359 and U.S. Pat. No. 4,345,262 are suitable. Furthermore, if conditions described in U.S. Pat. No. 4,313,124 of an invention concerning the rate of temperature increase of the thermal action face are employed, further excellent recording can be performed.

For the configuration of the recording head, the present invention is effective for the configuration using U.S. Pat. No. 4,558,333 and U.S. Pat. No. 4,459,600 each disclosing a configuration in which a thermal action part is located in a bending area, in addition to the configuration of combination of a discharge port, a liquid channel and an electrothermal converter (linear liquid channel or right angle liquid channel) described in the specifications described above. In addition, the present invention is effective for the configuration a discharge hole common over a plurality of electrothermal converters is determined to be a discharge part of the electrothermal converter (Japanese Patent Application Laid-Open No. S59-123670, etc.). Further, a full line type recording head having a length corresponding to the wide of a maximum recording medium, on which the recording apparatus can perform recording, may have a configuration of covering the length by a combination of a plurality of recording heads as disclosed in the specifications described above, or a configuration as one recording head formed as one united body, but the present invention can exhibit the above effect still further effectively.

In addition, the present invention is also effective when using a replaceable chip type recording head that can be electrically connected to an apparatus main body and supplied with ink from the apparatus main body by mounting the recording head on the apparatus main body, or a cartridge type recording head provided in the recording head itself as one united body. Furthermore, it is preferable that recovery means for the recording head, preliminary auxiliary means and the like, which is provided as a configuration of a recording apparatus that is applied, is added because the effect of the present invention can be still further stabilized. They specifically include capping means for the recording head, cleaning means, pressure or suction means, an electrothermal converter or other heating element or preliminary heating means with a combination thereof, and a preliminary discharge mode performing discharge other than recording.

EXAMPLES

The present invention will be specifically described below using Examples, but they are not intended to limit the scope of the present invention. Furthermore, % described herein is % by mass unless otherwise specified.

Components shown below were mixed, sufficiently stirred and dissolved and/or dispersed, and then filtered under pressure by Fluoropore Filter having a pore size of 0.1 μm (trade name: manufactured by Sumitomo Electric Industries, Ltd.) to prepare inks of Examples and Comparative Examples, respectively.

Ink Composition of Example 1

| | |
|---|---|
| Cabojet 300 (water-dispersible coloring material, water-soluble group: carboxylic group) | 2% |
| Glycerin | 10% |
| Ethylene glycol | 5% |
| Surfactant of general formula (VIII) (ethylene oxide 10 mol adduct) | 2% |
| Pure water | the rest |

Ink Composition of Example 2

| | |
|---|---|
| Cabojet 300 (water-dispersible coloring material, water-soluble group: carboxylic group) | 2% |
| Glycerin | 7% |
| Ethylene urea | 10% |
| Surfactant of general formula (VIII) (ethylene oxide 10 mol adduct) | 1% |
| Pure water | the rest |

The used amount of ethylene urea described above is equal to or greater than a saturation concentration with respect to the used amount of glycerin.

Ink Composition of Example 3

| | |
|---|---|
| Cabojet 200 (water-dispersible coloring material, water-soluble group: carboxylic group) | 2% |
| Glycerin | 10% |
| Ethylene glycol | 5% |
| Surfactant of general formula (VIII) (ethylene oxide 10 mol adduct) | 2% |
| Pure water | the rest |

Example 4

Production of Dispersion Solution

Using benzyl methacrylate, methacrylic acid and ethoxy ethylene glycol methacrylate as raw materials, an ABC type block polymer having an acid value of 350 and a number average molecular weight of 5000 was made according to a conventional method, and the block polymer was neutralized with an aqueous potassium hydroxide solution, and diluted with ion-exchange water to prepare a homogenous 50% aqueous polymer solution. 60 g of the 50% aqueous polymer solution, 100 g of carbon black and 340 g of ion-exchange water were mixed together, and the resultant mixture was mechanically stirred for 0.5 hours. Then, using a micro-fluidizer, the mixture was treated by passing the mixture through an interacting chamber five times under a liquid pressure of about 10,000 psi (about 70 Mpa) to obtain dispersions. The dispersions were subjected to centrifugal separation processing (12,000 rpm, 20 minutes), whereby coarse particles were removed to obtain a dispersion solution 1. The obtained dispersion solution 1 had a pigment concentration of 10% and a dispersant concentration of 3.5%.

Ink Composition:

| | |
|---|---|
| Dispersion solution 1 prepared by the method described above (water-soluble group: carboxylic group) | 33% |
| Triethylene glycol | 7% |
| 1,5-Pentanediol | 7% |
| 1,2,6-Hexanediol | 7% |
| $C_{16}H_{33}(CH_2CH_2O)_{10}H$ (liquid, HLB = 13)) | 1% |
| Pure water | the rest |

Ink Composition of Example 5

| | |
|---|---|
| Cabojet 300 (water-dispersible coloring material, water-soluble group: carboxylic group) | 2% |
| Cabojet 200 (water-dispersible coloring material, water-soluble group: sulfonic group) | 1% |
| Glycerin | 7% |
| Ethylene urea | 10% |
| Surfactant of general formula (VIII) (ethylene oxide 10 mol adduct) | 2% |
| Pure water | the rest |

The used amount of ethylene urea described above is equal to or greater than a saturation concentration with respect to the used amount of glycerin.

Ink Composition of Example 6

| | |
|---|---|
| Water-dispersible coloring material used in Example 5 (water-soluble group: carboxylic group) | 33% |
| Glycerin | 9% |
| 1,5-Pentanediol | 9% |
| $C_{16}H_{33}(CH_2CH_2O)_{10}H$ (liquid, HLB = 13)) | 1% |
| Pure water | the rest |

Example 7

Production of Dispersion of Coloring Material

Using benzyl methacrylate and methacrylic acid as raw materials, an AB type block polymer having an acid value of 250 and a number average molecular weight of 3000 was made according to a conventional method, and the block polymer was neutralized with an aqueous potassium hydroxide solution, and diluted with ion-exchange water to prepare a homogenous 50% aqueous polymer solution. 100 g of the polymer solution, 100 g of C.I. Pigment Red 122 and 300 g of ion-exchange water were mixed together, and the resultant mixture was mechanically stirred for 0.5 hours. Then, using a micro-fluidizer, the mixture was treated by passing the mixture through an interacting chamber five times under a liquid pressure of about 10,000 psi (about 70 Mpa) to obtain dispersions. The dispersions were subjected to centrifugal separation processing (12,000 rpm, 20 minutes), whereby undispersed matters including coarse particles were removed to obtain a dispersion solution 2. The obtained dispersion solution 2 had a pigment concentration of 10% and a dispersant concentration of 5%.

Ink Composition:

| Dispersion solution 2 (water-soluble group: carboxylic group) | 35% |
|---|---|
| Diethylene glycol | 5% |
| Triethylene glycol | 7% |
| Trimethylol propane | 7% |
| Surfactant of general formula (VIII) (ethylene oxide 6 mol adduct) | 0.2% |
| $C_{16}H_{33}(CH_2CH_2O)_{10}H$ (liquid, HLB = 13)) | 1% |
| Pure water | the rest |

Ink Composition of Example 8

| Water-dispersible coloring material used in Example 5 (water-soluble group: carboxylic group) | 20% |
|---|---|
| Glycerin | 7% |
| 1,5-Pentanediol | 7% |
| Ethylene urea | 7% |
| $C_{16}H_{33}(CH_2CH_2O)_{10}H$ (liquid, HLB = 13)) | 1% |
| Pure water | the rest |

Ink Composition of Example 9

| Water-dispersible coloring material used in Example 5 (water-soluble group: carboxylic group) | 25% |
|---|---|
| Glycerin | 7% |
| 1,2,6-Hexanediol | 7% |
| $C_{16}H_{33}(CH_2CH_2O)_5H$ (liquid, HLB = 9)) | 1% |
| Pure water | the rest |

Ink Composition of Example 10

| Cabojet 300 (water-dispersible coloring material, water soluble group: carboxylic group) | 2% |
|---|---|
| Ethylene glycol | 7% |
| Diethylene glycol | 5% |
| Trimethylol propane | 7% |
| Surfactant of general formula (VIII) (ethylene oxide 10 mol adduct) | 0.5% |
| Pure water | the rest |

Example 11

59 parts of ion-exchange water, 5.2 parts of triethanol amine lauryl sulfate, 21 parts of methyl styrene, 17 parts of methacrylonitrile and 0.5 parts of ammonium persulfate subjected to a mixing stirring reaction under a nitrogen gas flow in a reaction vessel with a circulation pipe at 80° C. for 3 hours to obtain an emulsion polymer having a solid content of 38% by mass. Then, 3 parts of C.I. Basic Violet 11, 7 parts of sodium polyoxyethylene lauryl ether sulfate and 90 parts of ion-exchange water were added to 100 parts of the obtained emulsion polymer, the mixture was mixed and stirred at 90° C. for 3 hours, then cooled to normal temperature, 7.5 parts of glycerin, 7.5 parts of 12-propanediol, 5 parts of ethylene glycol, 1.3 parts of surfactant of general formula (VIII) (ethylene oxide 10 mol adduct) and ion-exchange water were added to the resultant mixture, and the mixture was sufficiently stirred to obtain a fluorescent ink having a solid content of 10% by mass.

Ink Composition of Reference Example 1

| Water-dispersible coloring material used in Example 5 (water-soluble group: carboxylic group) | 20% |
|---|---|
| Water-dispersed coloring material prepared by the following method (water-soluble group: carboxylic group) | 5% |
| Triethylene glycol | 7% |
| 1,5-Pentanediol | 7% |
| $C_{16}H_{33}(CH_2CH_2O)_{18}H$ (liquid, HLB = 15.1)) | 1% |
| Surfactant of general formula (VIII) (ethylene oxide 6 mol adduct) | 0.5% |
| Pure water | the rest. |

(Preparation of Water-Dispersed Coloring Material)

Using benzyl methacrylate and methacrylic acid as a raw material, an AB type block polymer having an acid value of 250 and a number average molecular weight of 3000 was made according to a conventional method, and the block polymer was neutralized with an aqueous potassium hydroxide solution, and diluted with ion-exchange water to prepare a homogenous 50% aqueous polymer solution. 180 g of the polymer solution, 100 g of C.I. Pigment Blue 15:3 and 220 g of ion-exchange water were mixed together, and the resultant mixture was mechanically stirred for 0.5 hours. Then, using a micro-fluidizer, the mixture was treated by passing the mixture through an interacting chamber five times under a liquid pressure of about 10,000 psi (about 70 Mpa) to obtain dispersion solution. Further, the dispersion solution was subjected to centrifugal separation processing (12,000 rpm, 20 minutes), whereby undispersed matters including coarse particles were removed to obtain a dispersion solution. The obtained dispersion solution had a pigment concentration of 10% by mass and a dispersant concentration of 10% by mass.

Ink Composition of Reference Example 2

| Water-dispersible coloring material used in Example 5 (water-soluble group: carboxylic group) | 2.5% |
|---|---|
| Glycerin | 7% |
| 1,2,6-Hexanediol | 7% |
| $C_{16}H_{33}(CH_2CH_2O)_{11}H$ (liquid, HLB = 13.2)) | 1% |
| Pure water | the rest |

Ink Composition of Reference Example 3

| | |
|---|---|
| Water-dispersible coloring material used in Example 5 (water-soluble group: carboxylic group) | 2.5% |
| Glycerin | 7% |
| 1,2,6-Hexanediol | 7% |
| $C_{16}H_{33}(CH_2CH_2O)_4H$ (liquid, HLB = 8)) | 1% |
| Pure water | the rest |

Ink Composition of Reference Example 4

| | |
|---|---|
| Cabojet 300 (water-dispersible coloring material, water-soluble group: carboxylic group) | 2% |
| Ethylene glycol | 7% |
| Diethylene glycol | 5% |
| Trimethylol propane | 7% |
| Surfactant of general formula (VIII) (ethylene oxide 10 mol adduct) | 0.1% |
| Pure water | the rest |

Ink Composition of Reference Example 5

| | |
|---|---|
| Cabojet 300 (water-dispersible coloring material, water-soluble group: carboxylic group) | 5% |
| Glycerin | 7% |
| 1,5-Pentanediol | 7% |
| Surfactant of general formula (VIII) (ethylene oxide 10 mol adduct) | 1% |
| Pure water | the rest |

Ink Composition of Comparative Example 1

| | |
|---|---|
| C.I. Food Black 2 (water-soluble coloring material, water-soluble group: sulfonic group) | 2% |
| Glycerin | 10% |
| Ethylene glycol | 5% |
| Surfactant of general formula (VIII) (ethylene oxide 10 mol adduct) | 2% |
| Pure water | the rest |

Ink Composition of Comparative Example 2

| | |
|---|---|
| C.I. Food Black 2 (water-soluble coloring material, water-soluble group: sulfonic group) | 2% |
| Glycerin | 10% |
| Ethylene glycol | 5% |
| Pure water | the rest |

Ink Composition of Comparative Example 3

| | |
|---|---|
| C.I. Food Black 195 (water-soluble coloring material, water-soluble group: sulfonic group) | 2% |
| Glycerin | 10% |
| Ethylene glycol | 5% |
| Pure water | the rest |

Ink Composition of Comparative Example 4

| | |
|---|---|
| Cabojet 300 (water-dispersible coloring material; water-soluble group: carboxylic group) | 2% |
| Glycerin | 7% |
| Ethylene glycol | 7% |
| Pure water | the rest |

Ink Composition of Comparative Example 5

| | |
|---|---|
| Cabojet 300 (water-dispersible coloring material, water-soluble group: carboxylic group) | 2% |
| Glycerin | 7% |
| Ethylene glycol | 7% |
| Isopropyl alcohol | 6% |
| Pure water | the rest |

Ink Composition of Comparative Example 6

| | |
|---|---|
| Water-dispersible coloring material used in Example 5 (water-soluble group: carboxylic group) | 2% |
| Glycerin | 7% |
| Trimethylol propane | 7% |
| Pure water | the rest |

<Evaluation>

Evaluation on Separation of Coloring Material 1

0.5 ml of each ink of Examples and Comparative Examples was dropped onto a commercially available fine paper from the height of 10 cm above the paper surface using a commercially available dropper, and a change of an ink droplet on the fine paper was evaluated according to the following criteria.

A: On the paper surface, an image region with the concentrated coloring material (concentrated image) was formed at the center and in the entire periphery thereof, an enclosing region with a liquid medium was clearly formed. Moreover, the spread of the liquid medium was observed on the back of the paper.

B: On the paper surface, a concentrated image with the coloring material was formed at the center and in the entire periphery thereof, an enclosing region formed with a liquid medium was slightly observed at the edge of the concentrated image. Spread of the liquid medium was observed on the back of the paper.

C: On the paper surface, a concentrated image with the coloring material was formed at the center but in the entire periphery thereof, an enclosing region formed with a liquid medium was not observed. Spread of the liquid medium was observed on the back of the paper.

D: On the paper surface, a concentrated image with the coloring material was formed at the center but in the entire periphery thereof, an enclosing region formed with a liquid medium was not observed. Furthermore, spread of the liquid medium was not observed on the back of the paper.

Evaluation on Minute Aggregations of Coloring Material

Independent dots were printed on a commercially available fine paper as a printing paper with each ink of Examples and Comparative Examples using a commercially available inkjet recording apparatus, BJS 600 (trade name, manufactured by Canon), and evaluation was made according to the following criteria under magnification of 300× using a microscope.

A: A large number of minute aggregates of the coloring material were observed within the dot on the paper surface.

C: A large number of minute aggregates of the coloring material was not observed but solid aggregation of the coloring material was observed within the dot on the paper surface.

Evaluation on Quality

Alphanumeric characters were printed on a commercially available fine paper as a printing paper with each ink of Examples and Comparative Examples using a commercially available inkjet recording apparatus, BJS 600 (trade name, manufactured by Canon Inc.), and visual evaluation was made according to the following criteria.

A: Sharp and blur-free good print quality was obtained.
B: The print was lacking in sharpness, but had no blur.
C: The print was lacking in sharpness and had blur.

Evaluation on Sticking Resistance

Each ink of Examples and Comparative Examples was placed in a commercially available ink-jet recording apparatus, BJS 600 (trade name, manufactured by Canon Inc.), left standing under the environment of 35° C. and humidity of 10% for a month, and then returned to the normal-temperature and normal-humidity environment, namely the environment of 25° C. and humidity of 50%, to print a solid image in 50% duty on a commercial available fine paper with the ink, and evaluation was made according to the following criteria.

AA: There were no faint and patchy printing and discharge failure, and a clear print was made.

A: Faint and patchy printing and discharge failure were slightly observed, but the situation recovered as printing was made continuously.

B: Faint and patchy printing and discharge failure were slightly observed, and the situation was not recovered as the print was made continuously, but was recovered when the recovery operation was carried out.

C: Thin spots and discharge faults were observed, and the situation was not recovered to the initial print as the print was made continuously and even when the recovery operation was carried out.

Evaluation on Water Resistance

A solid image of 50% Duty was printed on a commercial available fine paper with each ink of Examples and Comparative Examples using a commercially available inkjet recording apparatus, BJS 600 (trade name, manufactured by Canon Inc.), left standing for 24 hours. Then the image was immersed in city water for 5 minutes, and Macbeth RD918 was used to make evaluations on the change in print density according to the following criteria.

A: The change in density was less than 20%.
B: The change in density was in the range of 20% or greater to less than 50%.
C: The change in density was 50% or greater.
D: No printing.

Evaluation on Rub-Resistance

Alphanumeric characters were printed on a commercially available fine paper with each ink of Examples and Comparative Examples using a commercially available inkjet recording apparatus, BJS 600 (trade name, manufactured by Canon Inc.). The printed fine paper was then rubbed at the printed area with a paper wetted with water, and evaluation was made on smear around the printed area by naked eyes according to the following criteria.

A: No smear was observed around alphanumeric characters.

B: Smear was slightly observed around alphanumeric characters, but became unrecognizable when seen at a distance of 50 cm.

C: Smear was clearly observed around alphanumeric characters.

Evaluation on Storage Stability

Each ink of Examples and Comparative Examples was placed in a closed glass container, left standing under the environment of 60° C. for a month, then sampled, and diluted to a predetermined concentration with pure water, then the light absorbance was measured using a commercially available recording spectrophotometer U-3200 (trade name, manufactured by Hitachi, Ltd.), and evaluation was made according to the following criteria.

A: The change in light absorbance was less than 5% with respect to the ink before storage.

B: The change in light absorbance was less than 10% with respect to the ink before storage.

C: The change in light absorbance was 11% or greater with respect to the ink before storage.

Evaluation Results

The obtained results are shown in Table 1.

TABLE 1

| Evaluation | Examples | | | | | | | | | | | Reference Examples | | | | | Comparative Examples | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 | 1 | 2 | 3 | 4 | 5 | 6 |
| Separation of coloring material 1 | A | A | B | A | A | A | A | A | A | A | A | B | A | A | C | C | C | C | C | C | C | C |
| Minute aggregates of coloring material | A | A | A | A | A | A | A | A | A | A | A | C | C | C | C | C | C | C | C | C | C | C |
| Quality | A | A | A | A | A | A | A | A | A | A | A | A | A | A | A | A | C | C | B | A | C | A |
| Sticking resistance | A | AA | A | A | AA | A | A | A | A | A | A | A | A | A | A | B | A | A | C | B | C | A |

TABLE 1-continued

| | Examples | | | | | | | | | | | Reference Examples | | | | | Comparative Examples | | | | | |
|---|---|---|---|---|---|---|---|---|---|---|---|---|---|---|---|---|---|---|---|---|---|---|
| Evaluation | 1 | 2 | 3 | 4 | 5 | 6 | 7 | 8 | 9 | 10 | 11 | 1 | 2 | 3 | 4 | 5 | 1 | 2 | 3 | 4 | 5 | 6 |
| Water resistance | A | A | A | A | A | A | A | A | A | A | A | A | A | A | A | B | C | C | B | A | A | A |
| Rub-resistance | A | A | A | A | A | A | A | A | A | A | A | B | B | B | C | C | A | B | B | C | C | C |
| Storage stability | A | A | A | A | A | A | A | A | A | A | A | A | A | A | A | A | A | A | A | A | C | A |

Furthermore, the ink of Example 11 was irradiated with ultraviolet light having a wavelength of 254 nm to evaluate fluorescent emission properties. As a result, good fluorescent emission was observed even under daylight.

Further, with the ink of Example 1, an image pattern of 50% Duty was formed with two ink droplets discharging per dot on a commercially available A4 size fine paper using in a commercially available inkjet recording apparatus, BJS 600 (trade name, manufactured by Canon Inc.), the printed area was then rubbed with a paper wetted with water, and observation was made on smear around the printed area, but no smear was observed. Furthermore, the density of the printed area was improved in visual evaluation.

As described above, the present invention can provide a water-based ink, a recorded image and a recording method, which improve quality and image fastness of the recorded image as well as reliability including storage stability.

This application claims priority from Japanese Patent Application No. 2003-127621 filed May 2, 2003, which is hereby incorporated by reference herein.

What is claimed is:

1. A water-based ink comprising a liquid medium including water, a water-dispersible coloring material and a surfactant, wherein the ink forms a fixation state of the coloring material such that a plurality of interspersed minute aggregates of the water-dispersible coloring material is arranged on a recording medium,
   wherein the water-dispersible coloring material has hydrophilic groups on its surface,
   wherein the water-dispersible coloring material is contained in the ink at a concentration of 2% by mass or less, and
   wherein the surfactant is contained in the ink at a concentration equal to or greater than the critical micelle concentration but not greater than 2% by mass.

2. A water-based ink comprising a liquid medium including water, a water-dispersible coloring material, and a surfactant that is a poor solvent for the water-dispersible coloring material, wherein the ink forms on a recording material a concentrated image formed with an arrangement of a plurality of interspersed minute aggregates of the water-dispersible coloring material at a center, in an enclosed fixation state where the liquid medium is present around the entire periphery of the concentrated image including inside the recording material,
   wherein the water-dispersible coloring material has hydrophilic groups on its surface,
   wherein the water-dispersible coloring material is contained in the ink at a concentration of 2% by mass or less, and
   wherein the surfactant is contained in the ink at a concentration equal to or greater than the critical micelle concentration but not greater than 2% by mass.

3. A water-based ink comprising a liquid medium including water, a water-dispersible coloring material, a surfactant that is a poor solvent for the water-dispersible coloring material, and an organic solvent that is a good solvent for the water-dispersible coloring material, wherein the ink forms on a recording material a concentrated image formed with an arrangement of a plurality of interspersed minute aggregates of the water-dispersible coloring material at a center, in an enclosed fixation state where the liquid medium is present around the entire periphery of the concentrated image including inside the recording material,
   wherein the water-dispersible coloring material has hydrophilic groups on its surface,
   wherein the water-dispersible coloring material is contained in the ink at a concentration of 2% by mass or less, and
   wherein the surfactant is contained in the ink at a concentration equal to or greater than the critical micelle concentration but not greater than 2% by mass.

4. A water-based ink comprising a liquid medium including water, a water-dispersible coloring material having fluorescence and a surfactant, wherein the ink forms on a recording material a concentrated image formed with an arrangement of a plurality of interspersed minute aggregates of the water-dispersible fluorescent coloring material at a center, in an enclosed fixation state where the liquid medium is present around the entire periphery of the concentrated image including inside the recording material,
   wherein the water-dispersible coloring material has hydrophilic groups on its surface,
   wherein the water-dispersible coloring material is contained in the ink at a concentration of 2% by mass or less, and
   wherein the surfactant is contained in the ink at a concentration equal to or greater than the critical micelle concentration but not greater than 2% by mass.

5. A water-based ink comprising a liquid medium including water, a water-dispersible coloring material having fluorescence, and a surfactant that is a poor solvent for the water-dispersible coloring material, wherein the ink forms on a recording material a concentrated image formed with an arrangement of a plurality of interspersed minute aggregates of the water-dispersible fluorescent coloring material at a center, in an enclosed fixation state where the liquid medium is present around the entire periphery of the concentrated image including inside the recording material,
   wherein the water-dispersible coloring material has hydrophilic groups on its surface,
   wherein the water-dispersible coloring material is contained in the ink at a concentration of 2% by mass or less, and
   wherein the surfactant is contained in the ink at a concentration equal to or greater than the critical micelle concentration but not greater than 2% by mass.

6. A water-based ink comprising a liquid medium including water, a water-dispersible coloring material having fluorescence, a surfactant that is a poor solvent for the water-dispersible coloring material and an organic solvent that is a good solvent for the fluorescent water-dispersible coloring material, wherein the ink forms on a recording material a concentrated image formed with an arrangement of a plurality of interspersed minute aggregates of the water-dispersible fluorescent coloring material at a center, in an enclosed fixation state where the liquid medium is present around the entire periphery of the concentrated image including inside the recording material, wherein the water-dispersible coloring material has hydrophilic groups on its surface, wherein the water-dispersible coloring material is contained in the ink at a concentration of 2% by mass or less, and wherein the surfactant is contained in the ink at a concentration equal to or greater than the critical micelle concentration but not greater than 2% by mass.

7. The water-based ink jet recording ink according to any one of claims 1 to 6, wherein the water-based ink is an ink jet recording ink.

8. A method for forming an image on a recording material with a plurality of dots by applying a water-based ink to the recording medium, wherein the ink comprises a liquid medium including water, a water-dispersible coloring material and a surfactant, wherein the ink forms a fixation state of the coloring material such that a plurality of interspersed minute aggregates of the water-dispersible coloring material is arranged on a recording medium, wherein the water-based ink is applied such that the concentrated image regions are not adjacent between the dots, wherein the water-dispersible coloring material has hydrophilic groups on its surface, wherein the water-dispersible coloring material is contained in the ink at a concentration of 2% by mass or less, and wherein the surfactant is contained in the ink at a concentration equal to or greater than the critical micelle concentration but not greater than 2% by mass.

9. A method for forming an image on a recording material with a plurality of dots by applying a water-based ink to the recording medium, wherein the ink comprises a liquid medium including water, a water-dispersible coloring material and a surfactant, wherein the ink forms a fixation state of the coloring material such that a plurality of interspersed minute aggregates of the water-dispersible coloring material is arranged on a recording medium, wherein the image is formed such that the requirement of longitudinal resolution≠lateral resolution is met, wherein the water-dispersible coloring material has hydrophilic groups on its surface, wherein the water-dispersible coloring material is contained in the ink at a concentration of 2% by mass or less, and wherein the surfactant is contained in the ink at a concentration equal to or greater than the critical micelle concentration but not greater than 2% by mass.

10. A method for forming a fluorescent image on a recording material with a plurality of dots by applying a water-based ink to the recording medium, wherein the ink comprises a liquid medium including water, a water-dispersible fluorescent coloring material and a surfactant, wherein the ink forms a fixation state of the coloring material such that a plurality of interspersed minute aggregates of the water-dispersible coloring material is arranged on a recording medium, wherein the water-based ink is applied such that the concentrated image regions are not adjacent between the dots, wherein the water-dispersible coloring material has hydrophilic groups on its surface, wherein the water-dispersible coloring material is contained in the ink at a concentration of 2% by mass or less, and wherein the surfactant is contained in the ink at a concentration equal to or greater than the critical micelle concentration but not greater than 2% by mass.

11. A method for forming a fluorescent image on a recording material with a plurality of dots by applying a water-based ink to the recording medium, wherein the ink comprises a liquid medium including water, a water-dispersible fluorescent coloring material and a surfactant, wherein the ink forms a fixation state of the coloring material such that a plurality of interspersed minute aggregates of the water-dispersible coloring material is arranged on a recording medium, wherein the recorded image is formed such that the requirement of longitudinal resolution≠lateral resolution is met, wherein the water-dispersible coloring material has hydrophilic groups on its surface, wherein the water-dispersible coloring material is contained in the ink at a concentration of 2% by mass or less and wherein the surfactant is contained in the ink at a concentration equal to or greater than the critical micelle concentration but not greater than 2% by mass.

12. The image formation method according to any one of claims 8 to 11, wherein the recorded image is formed using an ink jet recording method in which thermal energy is applied to the ink to discharge an ink droplet to perform recording.

13. A recorded image formed by using the ink of claim 1, wherein a fixation state of the water-dispersible coloring material on a recording material is made by the plurality of interspersed minute aggregates of the water-dispersible coloring material.

14. A recorded image formed by using the ink of claim 4, wherein a fixation state of a water-dispersible coloring material having fluorescence on a recording material is made by the plurality of interspersed minute aggregates of the water-dispersible coloring material arranged on the recording medium.

15. The recorded image according to claim 13 or 14, wherein the recorded image is formed using an ink jet recording method in which thermal energy is applied to the ink to discharge an ink droplet to perform recording.

16. The image formation method according to any one of claims 8 to 11, wherein the image is formed by applying a plurality of ink droplets one upon another on the recording medium by using an ink jet recording apparatus.

17. The method according to claim 16, wherein the ink jet recording method is a thermal ink jet recording method.

18. The water-based ink according to claim 1, wherein each of the minute aggregates has a diameter of 5 μm to 20 μm.

19. The water-based ink according to claim 2, wherein each of the minute aggregates has a diameter of 5 μm to 20 μm.

20. The water-based ink according to claim 3, wherein each of the minute aggregates has a diameter of 5 μm to 20 μm.

21. The water-based ink according to claim 4, wherein each of the minute aggregates has a diameter of 5 μm to 20 μm.

22. The water-based ink according to claim 5, wherein each of the minute aggregates has a diameter of 5 μm to 20 μm.

23. The water-based ink according to claim 6, wherein each of the minute aggregates has a diameter of 5 μm to 20 μm.

24. The method according to claim 8, wherein each of the minute aggregates has a diameter of 5 μm to 20 μm.

25. The method according to claim 9, wherein each of the minute aggregates has a diameter of 5 μm to 20 μm.

26. The method according to claim 10, wherein each of the minute aggregates has a diameter of 5 μm to 20 μm.

27. The method according to claim 11, wherein each of the minute aggregates has a diameter of 5 μm to 20 μm.

* * * * *

UNITED STATES PATENT AND TRADEMARK OFFICE
CERTIFICATE OF CORRECTION

PATENT NO. : 7,303,620 B2
APPLICATION NO. : 10/975072
DATED : December 4, 2007
INVENTOR(S) : Akira Nagashima et al.

It is certified that error appears in the above-identified patent and that said Letters Patent is hereby corrected as shown below:

COLUMN 5
Line 10, "studies various mechaminisms" should read --studied various mechanisms--.

COLUMN 6
Line 9, "are" should read --is--.
Line 55, "because" should read --because of--.

COLUMN 9
Line 18, "adjacent" should read --adjacent to--.
Line 50, "are" should read --a--.

COLUMN 15
Line 40, "brings" should read --bringing--.

COLUMN 20
Line 45, "wide" should read --width--.

COLUMN 27
Line 42, "commercial" should read --commercially--.

COLUMN 28
Line 6, "commercial" should read --commercially--.

Signed and Sealed this

Fifth Day of August, 2008

JON W. DUDAS
*Director of the United States Patent and Trademark Office*